United States Patent
Hoshuyama

(10) Patent No.: US 8,433,074 B2
(45) Date of Patent: Apr. 30, 2013

(54) ECHO SUPPRESSING METHOD AND APPARATUS

(75) Inventor: Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1070 days.

(21) Appl. No.: 12/084,043

(22) PCT Filed: Oct. 25, 2006

(86) PCT No.: PCT/JP2006/321268
§ 371 (c)(1),
(2), (4) Date: Apr. 24, 2008

(87) PCT Pub. No.: WO2007/049644
PCT Pub. Date: May 3, 2007

(65) Prior Publication Data
US 2009/0154717 A1    Jun. 18, 2009

(30) Foreign Application Priority Data
Oct. 26, 2005  (JP) .................. 2005-311181

(51) Int. Cl.
H04B 3/20    (2006.01)
H04M 9/08    (2006.01)

(52) U.S. Cl.
USPC ............... 381/66; 379/406.01; 379/406.05

(58) Field of Classification Search ............. 381/66, 381/92, 110, 93, 94.1, 94.3; 379/406.01–406.16; 370/289, 282–286
See application file for complete search history.

(56) References Cited

U.S. PATENT DOCUMENTS

| 5,608,793 A | 3/1997 | Uriya |
| 2004/0018860 A1 | 1/2004 | Hoshuyama |
| 2005/0213432 A1* | 9/2005 | Hoshuyama .......... 367/129 |

FOREIGN PATENT DOCUMENTS

| JP | 05-041681 | 2/1993 |
| JP | 08-009005 | 1/1996 |
| JP | 08-288894 | 11/1996 |
| JP | 09-116469 | 5/1997 |
| JP | 2000-252883 A | 9/2000 |
| JP | 2002-009677 A | 1/2002 |
| JP | 2004-012884 A | 1/2004 |
| JP | 2004012884 A * | 1/2004 |
| JP | 2004-056453 A | 2/2004 |
| JP | 2004056453 A * | 2/2004 |

OTHER PUBLICATIONS

English machine translation of JP2004-056453A and JP2004-012884A.*

(Continued)

Primary Examiner — Matthew Landau
Assistant Examiner — Khaja Ahmad
(74) Attorney, Agent, or Firm — Foley & Lardner LLP

(57) ABSTRACT

Converter 100 uses either the output signal of a sound pickup device or the signal obtained by subtracting the output signal of an echo canceller from the output signal of the sound pickup device as a first signal, uses an estimated crosstalk value indicative of an estimated value of the amount of crosstalk of an echo leaking into the first signal to correct the first signal, and limits the corrected first signal not to be smaller than estimated near-end noise.

20 Claims, 15 Drawing Sheets

OTHER PUBLICATIONS

An English machine translation of JP2004-056453A.*

A. Alvarez et al., "A Speech Enhancement System Based on Negative Beamforming and Spectral Subtraction," International Workshop on Acoustic Echo and Noise Control, Sep. 2001, pp. 219-222.

E. Hansler, "The hands-free telephone problem: an annotated bibliography update," Annals of Telecommunications, vol. 49:7-8, 1994, 11 pages.

J. Shynk, "Frequency-Domain and Multirate Adaptive Filtering," IEEE Signal Processing Magazine, Jan. 1992, pp. 14-37.

X. Lu et al., "Acoustical Echo Cancellation Over a Non-Linear Channel," International Workshop on Acoustic Echo and Noise Control, 2001, pp. 1-9.

* cited by examiner

ECHO SUPPRESSING METHOD AND APPARATUS

This application is the National Phase of PCT/JP2006/321268, filed Oct. 25, 2006, which claims priority to Japanese Application No. 2005-311181, filed Oct. 26, 2005, the disclosures of which are hereby incorporated by reference in their entirety.

TECHNICAL FIELD

The present invention relates to an echo suppressing method and apparatus for suppressing an echo generated when a loudspeaker produces audio and a microphone picks up sound at the same time.

BACKGROUND ART

FIG. 1 is a block diagram showing the configuration of an echo suppressing apparatus of a first example of related art.

FIG. 1 shows an exemplary configuration of an echo suppressing apparatus for suppressing an echo generated in a hands-free phone.

In FIG. 1, an audio signal from the far-end speaker (hereinafter referred to as far-end signal) inputted to input terminal 10 is converted into far-end audio by loudspeaker 2. On the other hand, microphone 1 picks up, for example, the voice of the near-end speaker (hereinafter referred to as near-end audio) and also receives unnecessary far-end audio produced by loudspeaker 2. The sound inputted from loudspeaker 2 to microphone 1 is called an echo. The sound transfer system that handles sound-related signals, ranging from the far-end signal to the output signal of microphone 1, is called an echo path. The sound transfer system includes loudspeaker 2 and microphone 1.

Only the near-end audio is desired to be outputted as the near-end signal from output terminal 9 of the echo suppressing apparatus, and the unnecessary far-end audio contained in the near-end signal is desired to be removed. In particular, when the near-end signal contains a large far-end audio signal component, delayed far-end audio is audible as an echo to the far-end speaker, so that it becomes difficult to have a conversation. To address such a problem, in a method employed in related art, a linear echo canceller is used to remove the echo from the near-end signal. A linear echo canceller is described, for example, in Non-Patent Document 1 (Eberhard HANSLER, "The hands-free telephone problem: an annotated bibliography update," annals of telecommunications 1994, pp. 360-367).

Linear echo canceller 3 estimates the transfer function of the echo path (echo path estimation), and uses the signal inputted to loudspeaker 2 (far-end signal) to produce a simulated signal (echo replica signal) of the echo inputted to microphone 1 based on the estimated transfer function.

The echo replica signal produced in linear echo canceller 3 is inputted to subtractor 4, which subtracts the echo replica signal from the output signal of microphone 1 to output the near-end signal.

Speech detector 5 receives the output signal of microphone 1, the output signal of linear echo canceller 3, the output signal of subtractor 4, and the far-end signal, uses these signals to detect whether or not the output signal of microphone 1 contains any near-end audio, and outputs the detection result to linear echo canceller 3.

To control the operation of linear echo canceller 3, speech detector 5 outputs "zero" or a very small value as the speech detection result when speech detector 5 has detected any near-end audio in the output signal of microphone 1, while outputting a large value when speech detector 5 has detected no near-end audio.

FIG. 2 is a block diagram showing an exemplary configuration of the linear echo canceller shown in FIG. 1.

As shown in FIG. 2, linear echo canceller 3 includes adaptive filter 30, which is a linear filter, and multiplier 35. Examples of adaptive filter 30 include filters of various types, such as an FIR type, an IIR type, and a lattice type.

Adaptive filter 30 filters the far-end signal inputted to terminal 31 and outputs the processed result from terminal 32 to subtractor 4. Adaptive filter 30 uses predetermined correlation operation to update a filter coefficient in such a way that the output signal of subtractor 4 inputted to terminal 33 is minimized. To this end, adaptive filter 30 operates in such a way that the component in the output signal of subtractor 4 that correlates with the far-end signal is minimized. That is, the echo (far-end audio) will be removed from the output signal of subtractor 4.

When the output signal of microphone 1 contains near-end audio and the filter coefficient is updated in such a state, the resultant change in the filter coefficient may reduce the echo removal capability of adaptive filter 30.

Multiplier 35 is provided to control the filter coefficient update operation performed by adaptive filter 30. Multiplier 35 multiplies the output signal of subtractor 4 by the output signal of speech detector 5 and outputs the computation result to adaptive filter 30. When the output signal of microphone 1 contains near-end audio, the output signal of speech detector 5 is either zero or a very small value as described above, so that the filter coefficient update operation performed by adaptive filter 30 is suppressed and hence the change in the filter coefficient is small. As a result, the echo removal capability is not greatly degraded.

Thus the echo suppressing apparatus of the first example of related art uses the adaptive filter to remove the echo of the far-end signal.

Next, an echo suppressing apparatus of a second example of related art will be described.

The echo suppressing apparatus of the second example of related art modifies a pseudo echo (echo replica signal), which is used to suppress an echo, according to the angle of a hinge in a folding-type mobile phone. Such a configuration is described, for example, in Japanese Patent Laid-Open No. 8-9005.

The echo suppressing apparatus of the second example of related art includes a control signal generator that detects the angle of the hinge and outputs a control signal according to the angle, and an echo controller that suppresses an echo based on the control signal.

The echo controller includes a coefficient selection circuit that holds a plurality of preset echo path tracking coefficients to produce a pseudo echo corresponding to the echo path that varies according to the angle of the hinge and that uses the control signal outputted from the control signal generator as an address signal to select an echo path tracking coefficient; an adaptive control circuit that outputs a pseudo echo modification signal to modify the pseudo echo based on the echo path tracking coefficient selected in the coefficient selection circuit; a pseudo echo generation circuit that generates the pseudo echo based on the pseudo echo modification signal; and a subtraction circuit that subtracts the produced pseudo echo from the output signal of an audio input unit (microphone).

Next, an echo suppressing apparatus of a third example of related art will be described.

The echo suppressing apparatus of the third example of related art is configured, for example, as described in Japanese Patent Laid-Open No. 9-116469.

The echo suppressing apparatus of the third example of related art suppresses the effects of an echo and surrounding noise that an adaptive filter alone cannot eliminate by determining a gain coefficient based on estimated values of the power of a far-end signal and the power of surrounding noise, subtracting an echo replica signal from the output signal of a microphone, and multiplying the signal obtained by the subtraction by the gain coefficient.

Next, an echo suppressing apparatus of a fourth example of related art will be described.

The echo suppressing apparatus of the fourth example of related art is based on the technology described, for example, in Japanese Patent Laid-Open No. 2004-056453. The echo suppressing apparatus of the fourth example of related art uses either the output signal of a microphone (sound pickup device) or the signal obtained by subtracting the output signal of an echo canceller from the output signal of the sound pickup device as a first signal, and uses the output signal of the echo canceller as a second signal. Then, the echo suppressing apparatus estimates the amount of crosstalk of the second signal (far-end signal, echo) that leaks into the first signal (near-end signal), and corrects the first signal based on the estimation result.

The estimated value of the amount of echo crosstalk is the ratio of the amount according to the amplitude or power of the second signal during the period in which no near-end audio is detected to the amount according to the amplitude or power of the first signal. In the echo suppressing apparatus of the fourth example of related art, for each frequency component in the first and second signals, the first and second signals are used to calculate the amount of estimated echo crosstalk, and the first signal is corrected based on the estimated value that has been calculated.

Although not being a technology for suppressing an echo generated by acoustic coupling between a sound pickup device and a loudspeaker, a technology for removing noise contained in an input signal is described, for example, in Japanese Patent Laid-Open No. 2004-12884 (hereinafter referred to as fifth example of related art).

In the fifth example of related art, the input audio spectrum is used to estimate a noise spectrum for each predetermined frequency range, and the estimated noise spectrum is subtracted from the input audio spectrum. However, a known flooring coefficient β is set in such a way that the amount of subtraction is not too large, that is, the amount of subtraction is limited in such a way that the subtraction result is not smaller than or equal to "β× input audio spectrum."

The echo suppressing apparatuses of the first and second examples of related art described above can sufficiently suppress an echo when nonlinear elements, such as distortion generated in the echo path, are small. However, in an actual apparatus, a loudspeaker, for example, has a large nonlinear element. The transfer function of an echo path containing distortion is nonlinear, so that linear echo canceller 3 cannot simulate an accurate transfer function of the echo path. In particular, when a small-sized loudspeaker used in a mobile phone or the like produces sound at high-volume levels, a large amount of distortion contained in the sound limits the suppression of the echo to approximately 20 dB. In this case, the echo is transmitted as the near-end signal and is audible to the far-end speaker, so that it becomes difficult to have a conversation.

In contrast, according to the third and fourth examples of related art, particularly the fourth example of related art, the echo is sufficiently suppressed even when the distortion generated in the echo path is large. However, in the echo suppressing apparatus of the fourth example of related art, when the amount of echo crosstalk cannot be estimated in an accurate manner due to the effects of near-end noise and the like, the corrected first signal that has been corrected based on the estimated amount of echo crosstalk, is degraded. That is, the echo is not sufficiently suppressed, or a large amount of distortion is generated in the near-end signal (near-end audio+near-end noise). When distortion is generated, the sound of the near-end signal is distorted as if modulated by the far-end signal. Specifically, the near-end signal becomes a muffled sound only when the amplitude of the far-end signal is large. For example, when the near-end signal is stationary noise, which sounds like "zhaa", the stationary noise is distorted and sounds like "zow zow" as if modulated by the far-end signal. On the other hand, when the near-end signal is audio, the near-end signal becomes a muffled sound only when the amplitude of the far-end signal is large. In the latter case, since the near-end audio itself changes by large amounts, the sound modulated by the far-end (disturbing sound) is buried in the near-end audio and hence less audible. However, in the former case, the stationary noise is modulated by the far-end signal and converted into a disturbing sound. In particular, in the fourth example of related art, when the echo suppressing apparatus is used in an environment in which near-end audio along with high-level noise is inputted to the apparatus, the error in the speech detection result likely increases, so that the amount of echo crosstalk is estimated in a reduced accuracy, resulting in a more disturbing sound.

DISCLOSURE OF THE INVENTION

Accordingly, an object of the present invention is to provide an echo suppressing method and apparatus that can sufficiently suppress an echo even when the echo path generates a large amount of distortion and reduce disturbing modulated sound of a near-end signal caused by a far-end signal.

In the present invention, the above object is achieved by using either the output signal of a sound pickup device or the signal obtained by subtracting the output signal of an echo canceller from the output signal of the sound pickup device as a first signal, using the output signal of the echo canceller as a second signal, using an estimated crosstalk value indicative of an estimated value of the amount of crosstalk of the second signal, which is the echo leaking into the first signal, to correct the first signal, and limiting the corrected first signal not to be smaller than an estimated value of near-end noise that has been estimated.

When the echo canceller is a linear echo canceller, harmonic wave components contained in the far-end signal almost directly appear in the output of the echo canceller. Even when the echo canceller is the nonlinear echo canceller, the output of the echo canceller contains quite a few harmonic wave components contained in the far-end signal.

On the other hand, the output signal of the sound pickup device (microphone) contains harmonic wave components generated by near-end noise, an echo of the far-end signal generated by acoustic coupling between the sound pickup device and a loudspeaker, and acoustic distortion. The nonlinear components in the echo can be removed from the first signal by using an estimated value of the proportion of the harmonic wave components, that is, the amount of echo crosstalk due to the nonlinear components, and the second signal to estimate the amount of echo contained in the first signal, and subtracting the estimated amount from the first signal, or using the estimated crosstalk value, the first signal and the second signal to estimate the proportion of the near-end signal contained in the first signal and multiplying the first signal by the estimated proportion. Then, by using the estimated crosstalk value to limit the corrected first signal not to be smaller than the estimated near-end noise, it is possible to reduce a disturbing modulated sound of the near-end signal caused by the far-end signal and generated in association with the removal of the nonlinear components in the echo by using a wrong estimated crosstalk value.

According to the present invention, by using the estimated crosstalk value to correct the first signal, the echo can be sufficiently suppressed even when the echo path generates a large amount of distortion. Further, by limiting the corrected first signal not to be smaller than an estimated near-end noise, a disturbing modulated sound of the near-end signal caused by the far-end signal can be reduced.

BEST MODE FOR CARRYING OUT THE INVENTION

Figure 3:
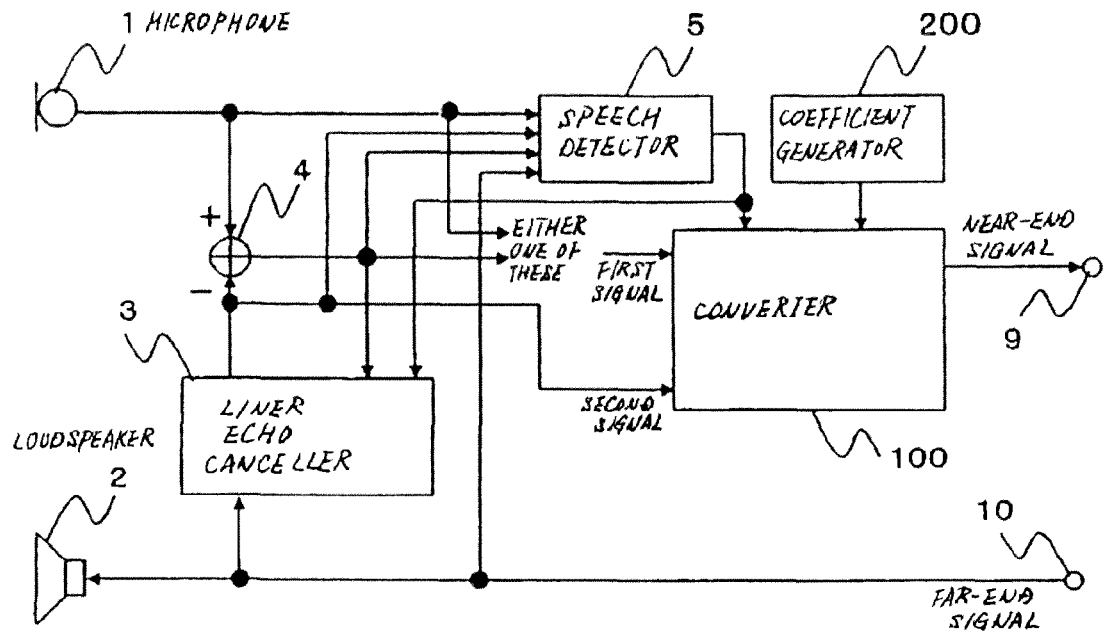
FIG. 3 is a block diagram showing an exemplary configuration of the echo suppressing apparatus according to the present invention.

FIG. 3 is a block diagram showing an exemplary configuration of the echo suppressing apparatus according to the present invention.

Figure 1:
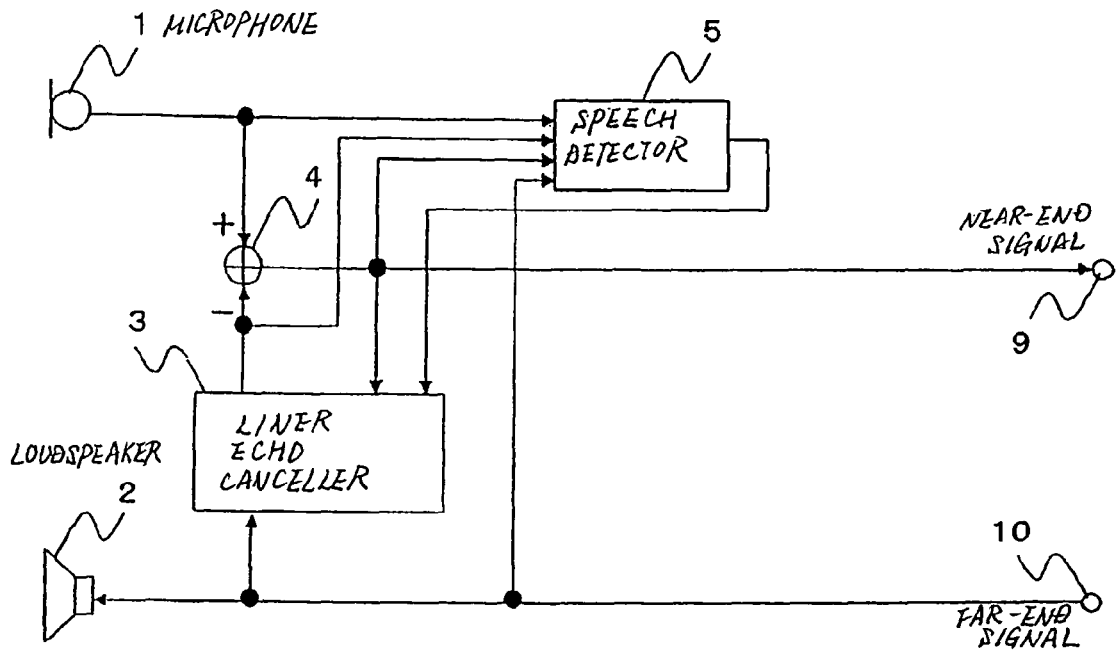
FIG. 1 is a block diagram showing the configuration of an echo suppressing apparatus of a first example of related art.
Figure 2:
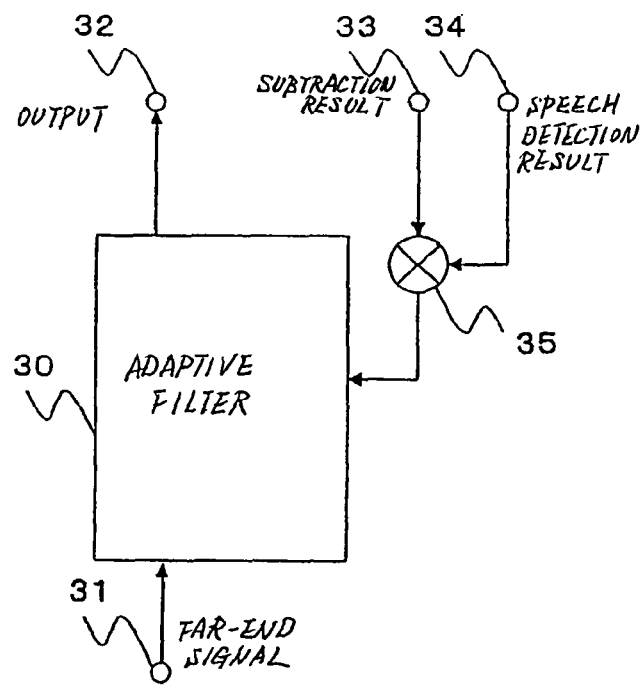
FIG. 2 is a block diagram showing an exemplary configuration of the linear echo canceller shown in FIG. 1.

As shown in FIG. 3, the echo suppressing apparatus of the present invention is the echo suppressing apparatus of the first example of related art shown in FIG. 1 combined with coefficient generator 200 that generates a coefficient (hereinafter referred to as crosstalk coefficient) used to calculate the amount of crosstalk of a far-end signal (echo) that leaks into a near-end signal, the crosstalk occurring due to the acoustic coupling between microphone 1 and loudspeaker 2, and converter 100 that uses either the output signal of microphone 1 or the output signal of subtractor 4 as a first signal and the output signal of linear echo canceller 3 as a second signal, corrects the first signal based on the crosstalk coefficient generated by coefficient generator 200 and the second signal, and outputs the near-end signal obtained by removing the echo from the first signal. The far-end signal inputted to loudspeaker 2 is inputted from terminal 10, and the near-end signal is outputted from terminal 9. Linear echo canceller 3 may be a nonlinear echo canceller.

Converter 100 uses the first signal and the second signal to estimate the amount of echo crosstalk, and corrects the first signal based on the estimated value (hereinafter referred to as estimated crosstalk value). Alternatively, the crosstalk coefficient generated in coefficient generator 200 is used as the estimated crosstalk value to correct the first signal. In this operation, the corrected first signal (absolute value), which has been corrected by using the estimated crosstalk value, is limited not to be smaller than the estimated near-end noise (absolute value), which has been separately estimated. The above processes are carried out, after the first and second signals are divided into signals in predetermined frequency ranges, for each of the frequency ranges. Coefficient generator 200 preferably switches among crosstalk coefficients according to a predetermined use condition set in advance.

Figure 4:
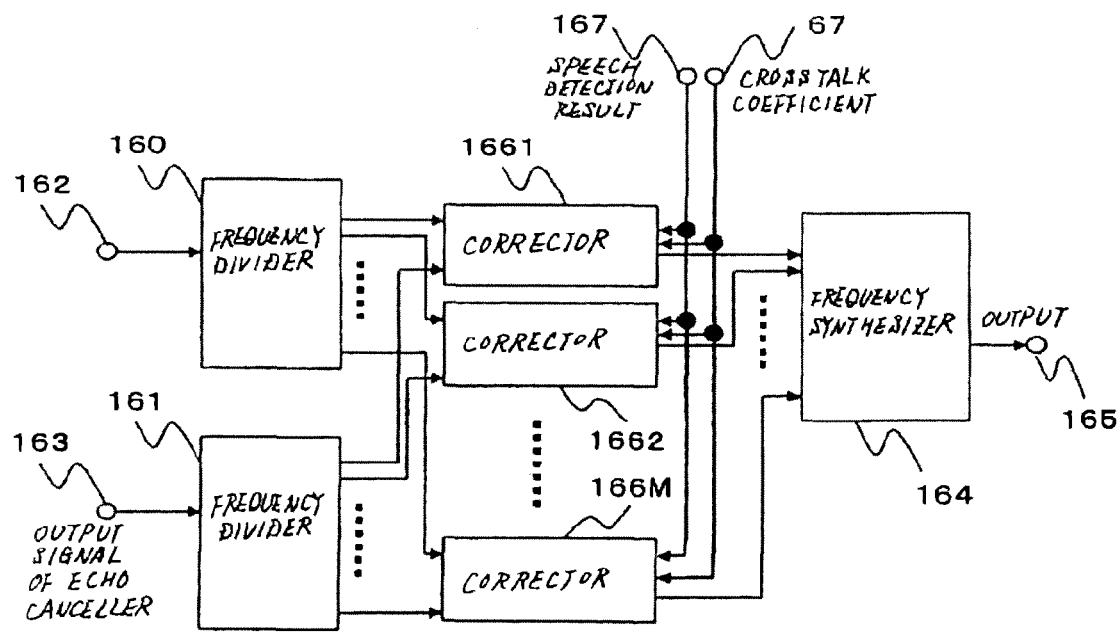
FIG. 4 is a block diagram showing an exemplary configuration of the converter shown in FIG. 3.

FIG. 4 is a block diagram showing an exemplary configuration of the converter shown in FIG. 3.

As shown in FIG. 4, converter 100 includes frequency dividers 160 and 161, M correctors 166*m* (m=1 to M), and frequency synthesizer 164.

Frequency divider 160 divides the first signal inputted through terminal 162 into M signals for respective predetermined frequency ranges and outputs them to correctors 166*m* corresponding to the respective frequency ranges. Frequency divider 161 divides the second signal inputted through terminal 163 into M signals for respective predetermined frequency ranges and outputs them to correctors 166*m* corresponding to the respective frequency ranges.

Corrector 166*m* uses the speech detection result inputted from speech detector 5 via terminal 167, the estimated crosstalk value calculated by using the first and second signals for the corresponding frequency range, and the second signal to correct the first signal, and outputs the corrected signal to frequency synthesizer 164. Alternatively, corrector 166*m* uses the crosstalk coefficient generated in coefficient generator 200 and inputted through terminal 67 as the estimated crosstalk value, uses this estimated value and the second signal to correct the first signal, and outputs the corrected signal to frequency synthesizer 164. The output signals of correctors 166*m* undergo frequency synthesis in frequency synthesizer 164, and the synthesized signal is outputted from terminal 165.

As the estimated crosstalk value, only one of the crosstalk coefficient and the value calculated from the first and second signals may be used, or these two values may be switched as appropriate for use. In a method for switching between the two types of estimated crosstalk values, for example, the estimated crosstalk value is calculated from the first and second signals when the near-end audio is greater than a predetermined threshold value, whereas the crosstalk coefficient is used as the estimated crosstalk value when the near-end audio is smaller than the predetermined threshold value.

Corrector 166*m* uses the estimated crosstalk value to correct the first signal and limits the corrected signal not to be smaller than the estimated value of the near-end noise estimated for each of the frequency ranges. Specifically, corrector 166*m* uses the estimated crosstalk value and the second signal to estimate the amount of echo contained in the first signal, subtracts the estimated amount of echo from the first signal, and limits the signal obtained by the subtraction not to be smaller than the estimated value of the near-end noise.

Alternatively, the estimated crosstalk value and the second signal may be used to estimate the amount of echo contained in the first signal, and the estimated amount of echo is subtracted from the first signal. The signal obtained by the subtraction is limited not to be smaller than the estimated value of the near-end noise and used as a third signal. Then, the third signal and the first signal are used to estimate the proportion of the near-end signal contained in the first signal, and the first signal is multiplied by the estimated proportion.

Frequency dividers 160 and 161 use an arbitrary linear transformation, such as Fourier transformation, cosine transformation, a subband analysis filter bank, to carry out frequency division. Frequency synthesizer 164 uses inverse Fourier transformation, inverse cosine transformation, and a subband synthesis filter bank corresponding to the linear transformation used in frequency dividers 160 and 161 to carry out frequency synthesis.

The echo suppressing apparatus of the present invention differs from the echo suppressing apparatus of the fourth example of related art in that an estimated crosstalk value is used to correct the first signal and the corrected signal is limited not to be smaller than the estimated near-end noise. According to the echo suppressing apparatus of the present invention, since the corrected first signal will not be smaller than the near-end noise, a disturbing modulated sound of the near-end signal caused by the far-end signal can be reduced even when the estimated crosstalk value is wrong.

Also, the echo suppressing apparatus of the present invention differs from the fourth example of related art, which uses the first and second signals to calculate the amount of echo crosstalk as appropriate, in that the crosstalk coefficient is a constant. In the fourth example of related art, a constant crosstalk coefficient is believed to be inappropriate because the amount of echo crosstalk depends on the frequency spectral distribution of the far-end signal. However, the present inventor has experimentally confirmed that the degree of difference in frequency spectral distribution between female and male voices allows use of a constant as the crosstalk coefficient and sufficient suppression of an echo as long as voice conversation is intended. This conclusion is described below in detail.

Figure 5:
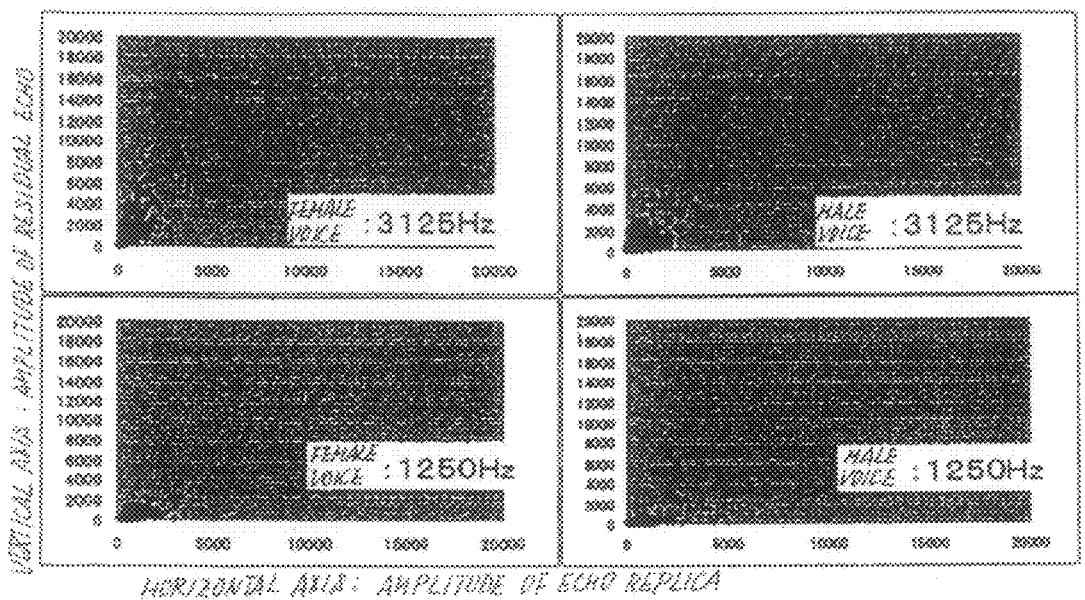
FIG. 5 shows graphs illustrating the results of experiments carried out to investigate the correlation between the echo replica signal spectrum and the residual echo spectrum.

FIG. 5 shows graphs illustrating the results of experiments carried out to investigate the correlation between the echo replica signal spectrum and the residual echo spectrum. The horizontal axis of each of the graphs shown in FIG. 5 represents the amplitude of the echo replica signal (the output amplitude of linear echo canceller 3), and the vertical axis represents the amplitude of the residual echo (the echo component contained in the first signal).

The slope of the correlation (the amplitude of the residual echo/the amplitude of the echo replica) represents the magnitude of the distortion of the echo. The steeper the slope, the larger the distortion. That is, the slope of the correlation corresponds to the crosstalk coefficient.

FIG. 5 shows that the slope of the correlation, even when derived from the same female voice, changes with frequency. The same argument applies to male voice. For the same frequency, however, the slope of the correlation for female voice is substantially the same as the slope of the correlation for male voice. Although not shown in FIG. 5, when the far-end signal is a sound, such as music, which is significantly different from human voice in terms of the spectral distribution, the slope of the correlation is completely different from that of human voice even at the same frequencies as those shown in the graphs in FIG. 5 (1250 Hz and 3125 Hz). The reason for this is that music or the like, which contains lower frequency components, contains much more frequency components that generates harmonic waves responsible for the residual echo than human voice does.

As described above, it has been confirmed that the slope of the correlation between the echo replica signal and the residual echo thus depends on the frequency spectral distribution of the far-end signal, but the degree of difference in frequency spectral distribution between female and male voices does not greatly change the slope of the correlation for each frequency, but the slopes of the correlation for female and male voices are similar to each other. This result proves that the same crosstalk coefficient may be used as long as voice conversation is intended.

However, as shown in FIG. 5, the slope of the correlation between the echo replica signal and the residual echo changes with frequency. The echo can therefore sufficiently be suppressed by generating different crosstalk coefficients for the frequency ranges of the first signal in coefficient generator 200 and by using a crosstalk coefficient according to each of the frequency ranges to correct the first signal in converter 100.

Distorted echo sound, which is believed not to be sufficiently suppressed by linear echo canceller 3, is broadly classified into distorted sound produced in loudspeaker 2 itself and distorted sound produced, when the housing in which microphone 1 and loudspeaker 2 are disposed, vibrates. Further, these distorted sounds change according to use conditions of the apparatus to which echo suppression is applied. Therefore, coefficient generator 200 desirably switches among the crosstalk coefficients according to use conditions of the apparatus to which echo suppression is applied and outputs the selected crosstalk coefficient.

A description will be made below with reference to the case where the crosstalk coefficient is switched according to the use conditions of a mobile phone by way of example.

Figure 6:
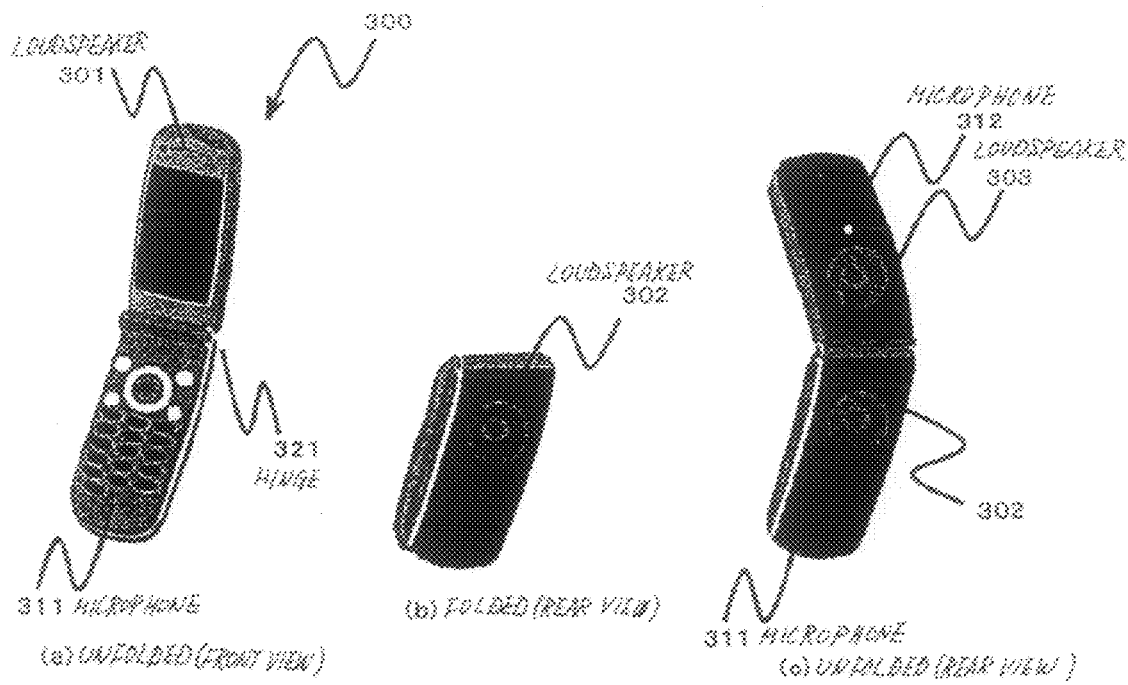
FIG. 6 is a diagrammatic view showing an exemplary configuration of a mobile phone including a plurality of loudspeakers and microphones.

The distorted sound produced in loudspeaker 2 itself results from nonlinear loudspeaker characteristics. Therefore, in a mobile phone in which a plurality of loudspeakers 301 to 303 having characteristics that are different from one another are switched as appropriate as shown in FIG. 6, distorted echo sound depends on which loudspeaker is used. In such a use condition, the loudspeaker being used may be detected, and the crosstalk coefficient may be switched according to the detected loudspeaker.

In a mobile phone equipped with only one loudspeaker 2 as well, the magnitude of distorted sound that reaches microphone 1 from loudspeaker 2 changes when the positional relationship between loudspeaker 2 and microphone 1 changes, so that the distortion of the echo also changes. In such a use condition, the position of loudspeaker 2 relative to microphone 1 may be detected, and the crosstalk coefficient may be switched according to the detected relative position. For example, in folding-type mobile phone 300 shown in FIG. 6, since the angle of hinge 321 determines the positional relationship between loudspeaker 2 and microphone 1, the angle of hinge 321 may be detected and the crosstalk coefficient may be switched according to the angle.

In folding-type mobile phone 300 shown in FIG. 6, when a plurality of microphones 311 and 312 are switched and used as appropriate, the positional relationship relative to loudspeaker 2 changes depending on which microphone is used. In such a use condition, the microphone being used may be detected, and the crosstalk coefficient may be switched to a predetermined one according to the position of the detected microphone.

On the other hand, the distorted sound resulting from the vibration of the housing is primarily produced at the joint that connects the parts. For example, when the sound outputted from loudspeaker 2 causes the housing to vibrate and distorted sound is produced from a joint that connects parts, the distorted sound is inputted to microphone 1 as the distortion of the echo. Therefore, when the sound level of loudspeaker 2 changes, the acoustic energy transmitted from loudspeaker 2 to the housing changes, and the distorted sound produced at the joint that connects the parts also changes. In such a use condition, the sound level that loudspeaker 2 has been set to produce may be detected, and the crosstalk coefficient may be switched according to the sound level that has been set.

In folding-type mobile phone 300 shown in FIG. 6, the amount of housing vibration varies depending on whether or not the mobile phone is completely folded, and the distorted sound produced at the joint that connects the parts also varies. In such a use condition, detection may be performed to determine whether or not mobile phone 300 is completely folded, and the crosstalk coefficient may be switched according to the detection result.

In folding-type mobile phone 300 shown in FIG. 6, the position of the loudspeaker changes with the folding angle, so that the acoustic energy, even when measured at the same location in the housing, that is transmitted from loudspeaker 2 changes with the angle of hinge 321, and hence the distorted sound produced at the joint that connects the parts changes. In such a use condition as well, the angle of hinge 321 may be detected, and the crosstalk coefficient may be switched according to the angle.

In a sliding-type mobile phone, detection may be performed to determine whether or not the sliding operation has occurred or to determine the amount of sliding, and the crosstalk coefficient may be switched according to the detection result. In a mobile phone including both the sliding and folding mechanisms, detection may be performed to determine the angle of the hinge, whether or not the mobile phone is folded, whether or not the sliding operation has occurred, or the amount of sliding, and the crosstalk coefficient may be switched according to the detection result. In a mobile phone that is not of the sliding-type or folding-type, detection may be performed to determine the factors that change the acoustic energy that is transmitted to the joint that connects the parts in the housing or to determine the factors that influence the change in echo sound level, and the crosstalk coefficient may be switched according to the detection result.

Figure 7:
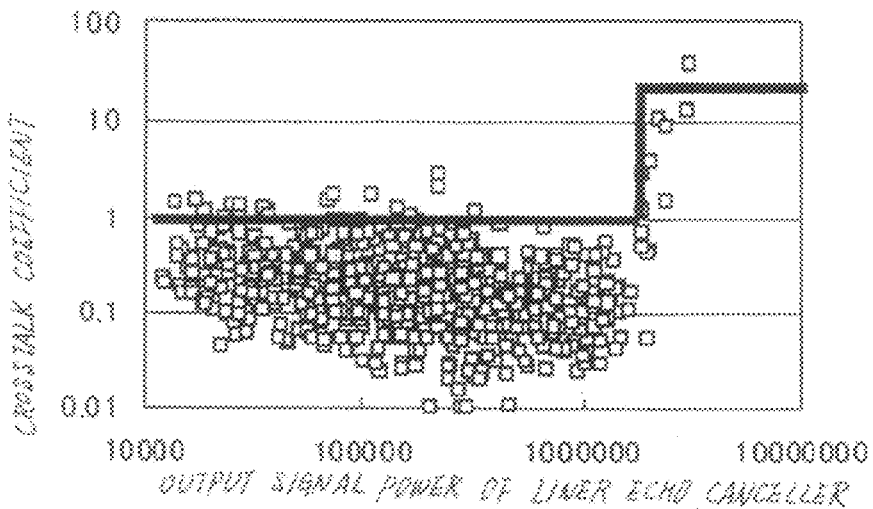
FIG. 7 shows a graph illustrating the relationship between the crosstalk coefficient that can sufficiently suppress an echo and the power of the output signal of the linear echo canceller.

Further, the present inventor has experimentally confirmed that any increase in power or amplitude of the signal outputted from linear echo canceller 3 will change a nonlinearity of the echo path. That is, when a distorted echo is produced under the condition in which the output signal of microphone 1 contains no near-end signal, an investigation is carried out to determine the relationship between the crosstalk coefficient that can sufficiently suppress the echo and the power of the output signal of linear echo canceller 3, and the result shown in FIG. 7 has been provided. FIG. 7 shows the relationship between the output signal of linear echo canceller 3 in a frequency band centered around 1875 Hz and the corresponding crosstalk coefficient. The horizontal axis of the graph shown in FIG. 7 represents the power of the output signal of linear echo canceller 3, and the vertical axis represents the crosstalk coefficient that can sufficiently suppress the echo.

As seen from the distribution of the plotted points shown in FIG. 7, the crosstalk coefficient that can sufficiently suppress the echo abruptly changes when the power of the output signal of linear echo canceller 3 reaches 2000000. The reason for this is believed to be an abrupt increase in distortion of the echo resulting from a nonlinear loudspeaker characteristics because, when the power of signal that is outputted from linear echo canceller 3 is large, this means that the power of the signal inputted to linear echo canceller 3, that is, the far-end signal inputted to loudspeaker 2, is also large.

Therefore, in the echo suppressing apparatus of the present invention, the power or amplitude of the signal outputted from linear echo canceller 3 is detected as the use condition, and the crosstalk coefficient is switched according to the detected value. In this method, the power or amplitude of the output signal of linear echo canceller 3 can be replaced with the power or amplitude of the far-end signal, or with the power or amplitude of a specific frequency component contained in the far-end signal.

The method for switching among crosstalk coefficients based on the output signal of linear echo canceller 3 is similar to a method for switching among crosstalk coefficients based on the sound level that loudspeaker 2 has been set to produce. In the latter method, however, a crosstalk coefficient according to the sound level setting is selected even when there is no far-end signal and hence no echo suppression is required. On the other hand, the former method is superior to the latter in that such a wrong crosstalk coefficient will not be selected.

In the method for switching among crosstalk coefficients described above, it is not necessary to detect all the use conditions described above to switch among crosstalk coefficients, but one or more of the use conditions may be detected to switch among crosstalk coefficients.

For example, in the situation where a mobile phone that is equipped with a plurality of cameras is used to make a call while both parties exchange their videos (a so-called TV phone), and where microphones and loudspeakers are automatically switched according to the camera being used in the mobile phone, direct detection of the microphone or loudspeaker being used may be replaced with detection of the microphone or loudspeaker being used based on image information captured by the camera.

Upon the determination of a use condition that is to be used in switching among crosstalk coefficients, an optimum crosstalk coefficient corresponding to that use condition is determined in an experiment or in a computer simulation, and the crosstalk coefficient along with the corresponding use condition is saved in coefficient generator 200.

The use conditions that can be detected by a sensor or the like that is provided external to the echo suppressing apparatus, such as the angle of the hinge, the sound level that the loudspeaker has been set to produce, and the loudspeaker being used, may be detected and the detection results may be inputted to coefficient generator 200. Other use conditions, such as the power or amplitude of the far-end signal, the power or amplitude of the output signal of linear echo canceller 3, and the power or amplitude of a specific frequency component contained in the far-end signal, may be detected in the echo suppressing apparatus, and the detection results may be inputted to coefficient generator 200.

According to the echo suppressing apparatus of the present invention, since an estimated crosstalk value is used to correct the first signal and the corrected signal is limited not to be smaller than an estimated value of the near-end noise, a disturbing modulated sound of the near-end signal caused by the far-end signal can be reduced even when the estimated crosstalk value that has been calculated is wrong. Further, by using a crosstalk coefficient, which is a constant set in advance according to a predetermined use condition, as the estimated crosstalk value, an echo produced in association with the echo path can be sufficiently suppressed even in an environment in which high-level noise is inputted as the near-end audio, because the constant crosstalk coefficient is not affected by noise.

Exemplary embodiments of the echo suppressing apparatus according to the present invention will now be described with reference to the corresponding FIGS.

First Exemplary Embodiment

Figure 8:
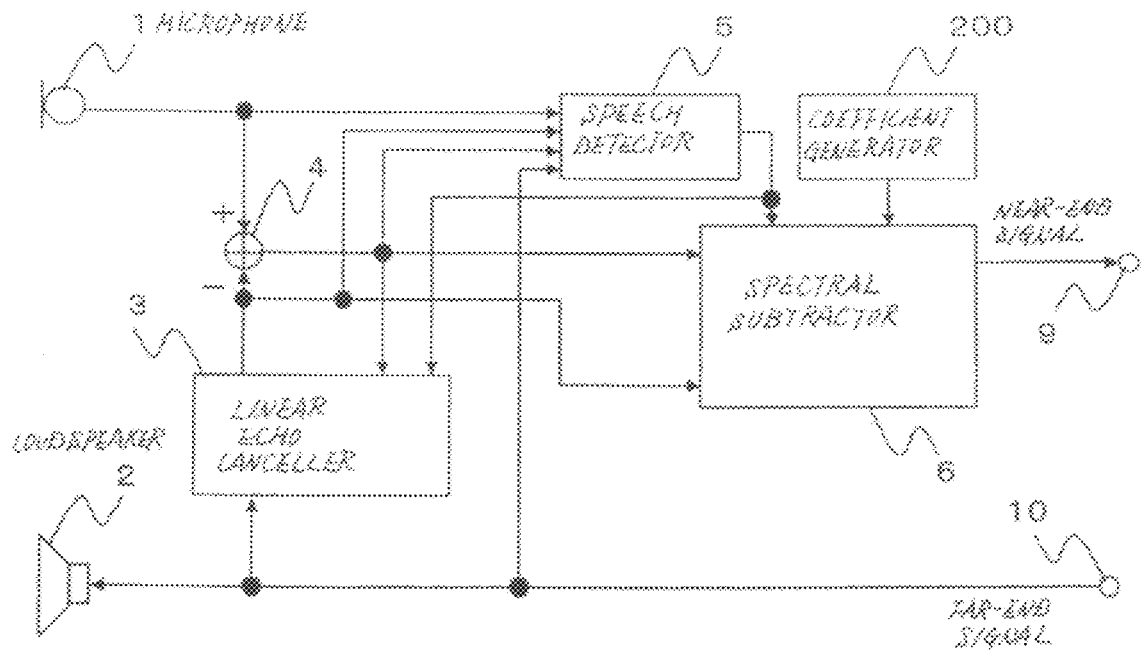
FIG. 8 is a block diagram showing the configuration of a first exemplary embodiment of the echo suppressing apparatus according to the present invention.

FIG. 8 is a block diagram showing the configuration of a first exemplary embodiment of the echo suppressing apparatus according to the present invention.

In the echo suppressing apparatus of the first exemplary embodiment, spectral subtractor 6 is used as converter 100 shown in FIG. 3. Coefficient generator 200 in the first exemplary embodiment generates a crosstalk coefficient indicative of the amount of echo crosstalk that is occurring due to acoustic coupling between microphone 1 and loudspeaker 2 as described above.

Spectral subtractor 6 receives the output signal of subtractor 4, the output signal of linear echo canceller 3, the crosstalk coefficient generated in coefficient generator 200, and the speech detection result from speech detector 5.

Spectral subtractor 6 divides the output signal of subtractor 4 and the output signal of linear echo canceller 3 into signals in respective predetermined frequency ranges, and removes echoes from the signal components in the divided frequency ranges.

<Coefficient Generator 200>

Figure 9:
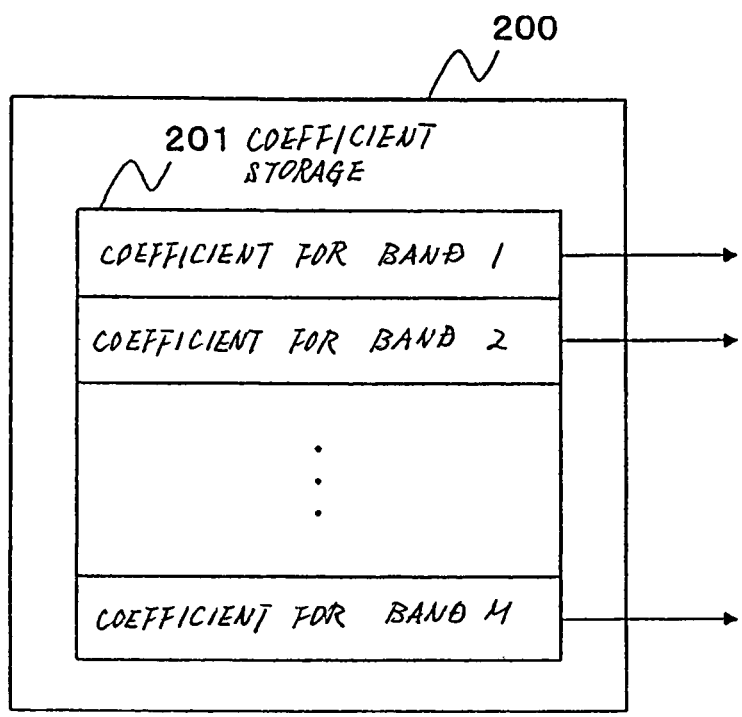
FIG. 9 is a block diagram showing an exemplary configuration of the coefficient generator shown in FIG. 8.

FIG. 9 is a block diagram showing an exemplary configuration of the coefficient generator shown in FIG. 8.

Coefficient generator 200 shown in FIG. 9 includes coefficient storage 201 that holds crosstalk coefficients appropriate for frequency ranges, band 1 to band M.

Coefficient generator 200 reads the crosstalk coefficient for each of the frequency ranges (bands) stored in coefficient storage 201 and outputs it to spectral subtractor 6. Such crosstalk coefficients correspond to, for example, the slope of correlation at the frequency of 1250 Hz and the slope of correlation at the frequency of 3125 Hz shown in FIG. 5.

Figure 10:
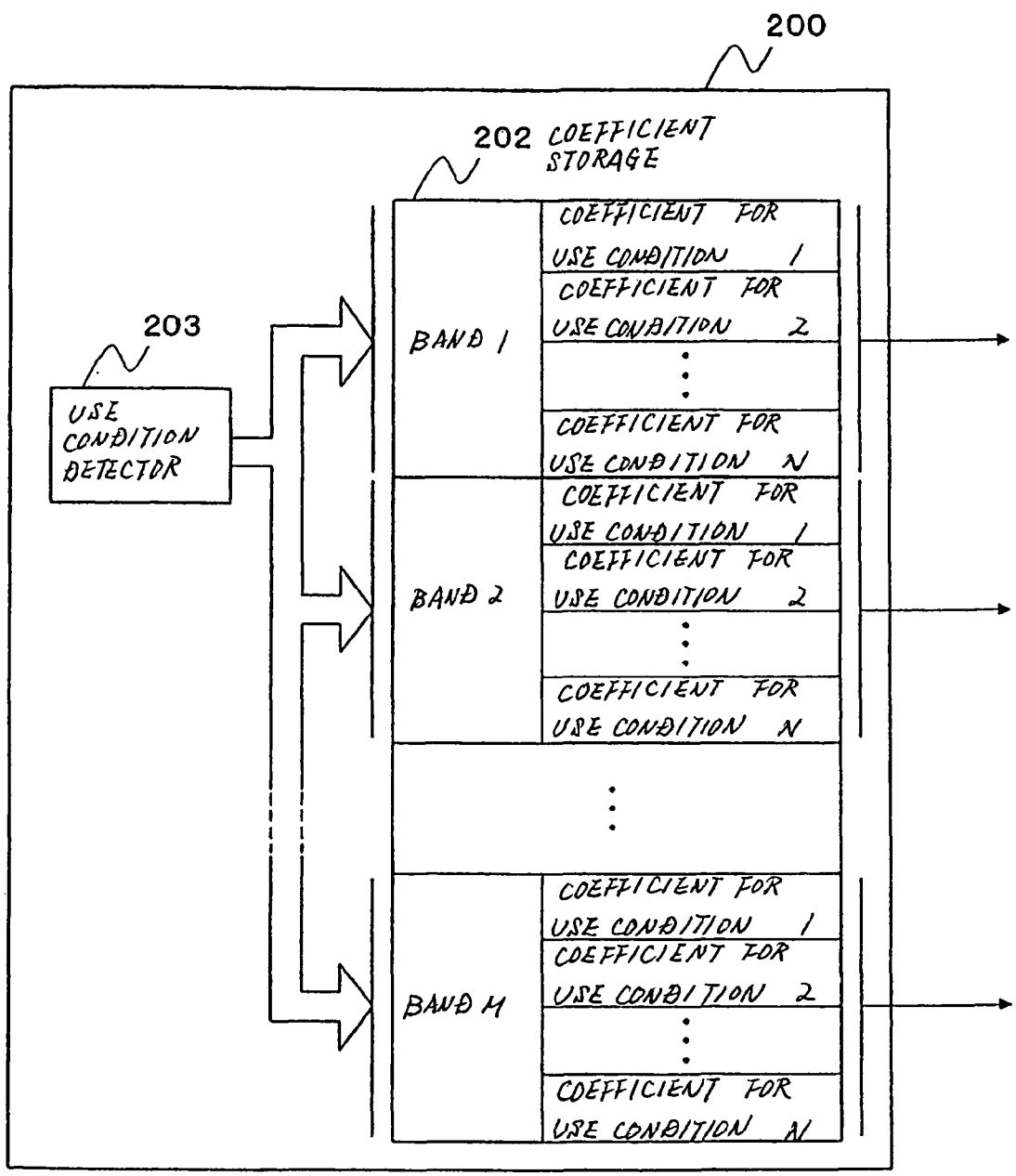
FIG. 10 is a block diagram showing another exemplary configuration of the coefficient generator shown in FIG. 8.

FIG. 10 is a block diagram showing another exemplary configuration of the coefficient generator shown in FIG. 8.

Coefficient generator 200 shown in FIG. 10 includes coefficient storage 202 that holds a group of crosstalk coefficients appropriate for the frequency ranges, band 1 to band M, and use condition detector 203 that detects various use conditions of a system including the echo suppressing apparatus of the present invention.

Coefficient generator 200 shown in FIG. 10 reads a crosstalk coefficient from the group of crosstalk coefficients corresponding to each of the frequency ranges, the crosstalk coefficient to be read corresponding to the use condition that is detected in use condition detector 203, and outputs the crosstalk coefficient that has been read to spectral subtractor 6.

In the configuration shown in FIG. 10, the group of crosstalk coefficients corresponding to each of the frequency ranges include the crosstalk coefficient for use condition 1, the crosstalk coefficient for use condition 2, . . . , the crosstalk coefficient for use condition N, where N is an arbitrary value being at least two.

As an example of a use condition, to detect the sound level that loudspeaker 2 has been set to produce, use condition detector 203 includes a sensor that detects the sound level that loudspeaker 2 has been set to produce and a discriminator that compares the detected sound level that has been set with a predetermined threshold value and converts the comparison result into a digital value representing at least two values.

As another example of a use condition, the angle of the hinge in a folding-type mobile phone is detected. In this case, use condition detector 203 includes a sensor (not shown) that detects the angle of the hinge and a discriminator (not shown) that compares the detected angle with a predetermined threshold value and converts the comparison result into a digital value that represents at least two values.

As another example of the use condition, to detect the loudspeaker being used in a mobile phone equipped with a plurality of loudspeakers, use condition detector 203 includes a judgment unit (not shown) that judges which loudspeaker is being used and outputs the judgment result using a digital value that represents at least two values.

As another example of the use condition, to detect the microphone being used in a mobile phone equipped with a plurality of microphones, use condition detector 203 includes a judgment unit (not shown) that judges which microphone is being used and outputs the judgment result using a digital value representing at least two values.

As another example of the use condition, to detect the power or amplitude of the output signal of linear echo canceller 3, use condition detector 203 includes a detector (not shown) that detects the power or amplitude of the output signal of linear echo canceller 3 and a discriminator (not shown) that compares the detected power or amplitude with a threshold value and converts the comparison result into a digital value representing at least two values. For example, when a system including the echo suppressing apparatus of the present invention is characterized as in the graph in FIG. 5, the necessary crosstalk coefficient abruptly changes from 1 to 20 when the output power of linear echo canceller 3 reaches 2000000. Therefore, the threshold value may be set to 2000000, and "0" may be outputted when the output power is smaller than or equal to 2000000, whereas "1" may be outputted when the output power is greater than 2000000.

In addition to the above use conditions, any use condition can be used as long as it affects the amount of echo crosstalk. It is also possible to use a combination of a plurality of use conditions.

Coefficient storage 202 selects one crosstalk coefficient corresponding to the output signal of use condition detector 203 from a plurality of crosstalk coefficients preregistered in correspondence to the frequency ranges, and outputs the selected crosstalk coefficient to spectral subtractor 6.

For example, when the power characteristics of the output signal of linear echo canceller 3 is used as the use condition, two crosstalk coefficients "1" and "20" indicated by the solid line in FIG. 7 are used. These two crosstalk coefficients correspond to the frequency range centered around 1875 Hz. The crosstalk coefficient "1" is outputted when use condition detector 203 outputs "0", whereas the crosstalk coefficient "20" is outputted when use condition detector 203 outputs "1".

<Spectral Subtractor 6>

Figure 11:
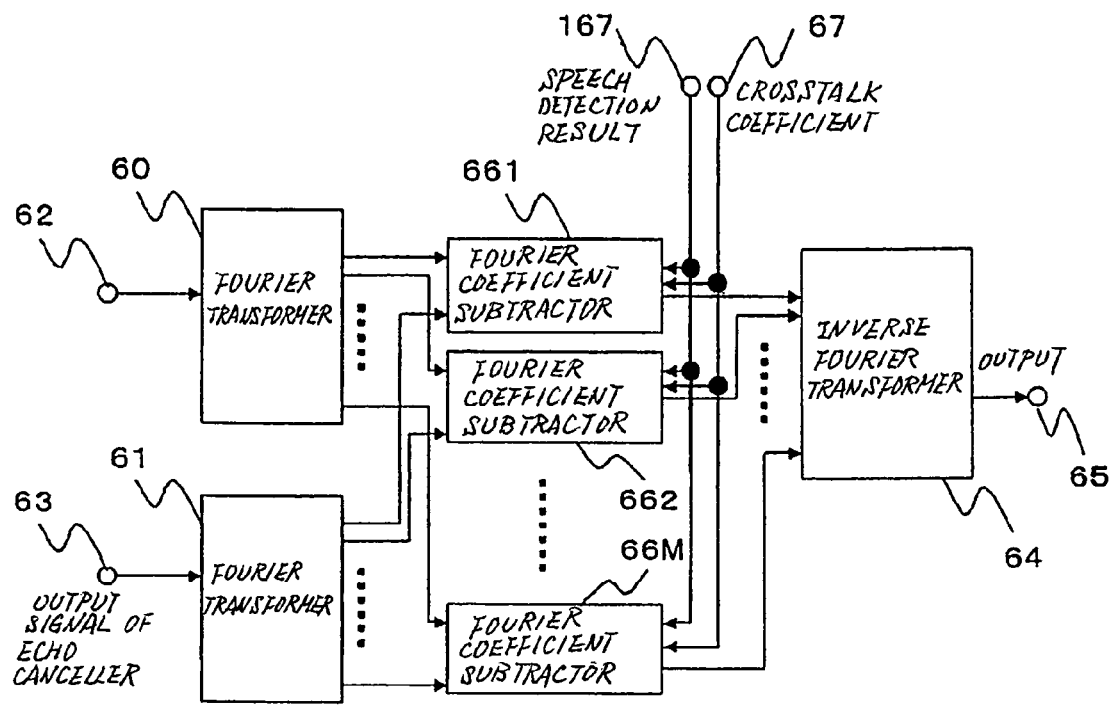
FIG. 11 is a block diagram showing an exemplary configuration of the spectral subtractor shown in FIG. 8.

FIG. 11 is a block diagram showing an exemplary configuration of the spectral subtractor shown in FIG. 8.

As shown in FIG. 11, spectral subtractor 6 includes Fourier transformers 60 and 61, Fourier coefficient subtractors 66$m$ (m=1 to M), and inverse Fourier transformer 64.

Fourier transformer 60 carries out M-point Fourier transformation on the output signal of subtractor 4 and outputs the processed results (amplitude and phase) as first Fourier coefficients to Fourier coefficient subtractors 66$m$ (m=1 to M) corresponding to the respective frequency ranges.

Fourier transformer 61 carries out M-point Fourier transformation on the echo replica signal outputted from linear echo canceller 3 and outputs the processed results (amplitude and phase) as second Fourier coefficients to Fourier coefficient subtractors 66$m$ corresponding to the respective frequency ranges.

Each of Fourier coefficient subtractors 66$m$ receives the first Fourier coefficient outputted from Fourier transformer 60 and the second Fourier coefficient outputted from Fourier transformer 61 as well as the crosstalk coefficient outputted from coefficient generator 200 and the speech detection result outputted from speech detector 5 shown in FIG. 8, carries out a subtraction operations using the amplitude components of the received signals to calculate Fourier coefficients, and outputs the calculation results (amplitude and phase) to inverse Fourier transformer 64.

Inverse Fourier transformer 64 carries out inverse Fourier transformation on the group of Fourier coefficients outputted from Fourier coefficient subtractors 661 to 66M, and outputs the real part of the processed result from terminal 65.

Fourier coefficient subtractors 66$m$ (m=1 to M) shown in FIG. 11 will be described with reference to FIG. 12.

Figure 12:
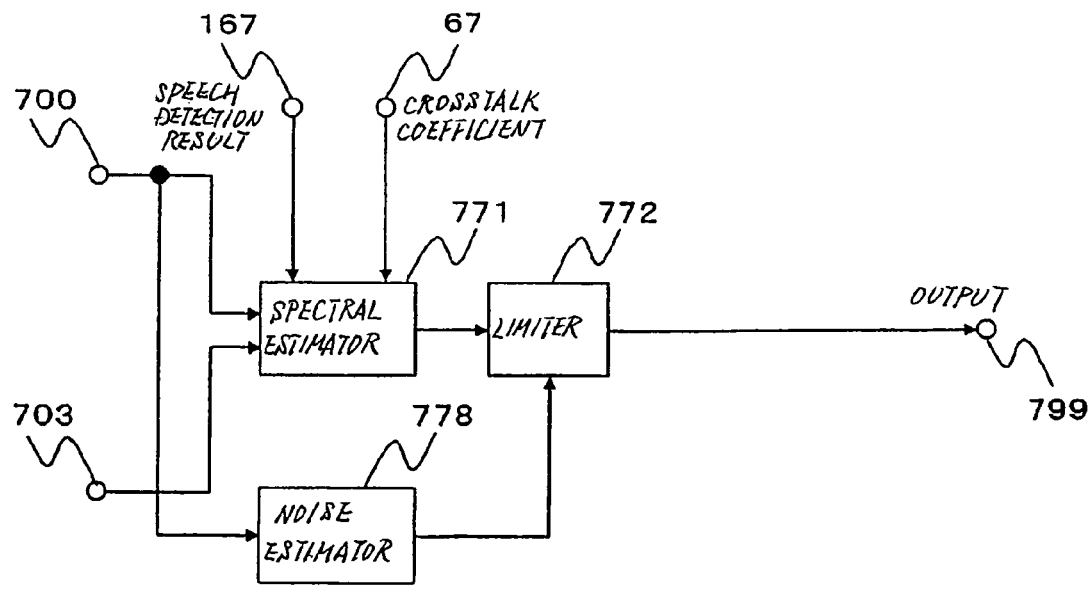
FIG. 12 is a block diagram showing an exemplary configuration of the Fourier coefficient subtractor shown in FIG. 11.

FIG. 12 is a block diagram showing an exemplary configuration of one of the Fourier coefficient subtractors shown in FIG. 11.

As shown in FIG. 12, Fourier coefficient subtractor 66$m$ includes spectral estimator 771, noise estimator 778, and limiter 772.

The first Fourier coefficient for each of the frequency ranges outputted from Fourier transformer 60 shown in FIG. 11 is supplied through terminal 700 to spectral estimator 771 and noise estimator 778.

The second Fourier coefficient outputted from Fourier transformer 61 shown in FIG. 11 is supplied through terminal 703 to spectral estimator 771. The crosstalk coefficient generated in coefficient generator 20 is outputted through terminal 67 to spectral estimator 771, and the speech detection result outputted from speech detector 5 is outputted through terminal 167 to spectral estimator 771.

Spectral estimator 771 removes the echo component in the first Fourier coefficient supplied through terminal 700 and outputs the computation result to limiter 772. Noise estimator 778 uses the first Fourier coefficient supplied through terminal 700 to estimate the value of the near-end noise and outputs the estimation result to limiter 772.

Limiter 772 uses the estimated value of the near-end noise received from noise estimator 778 to set the upper and lower limits of the signal received from spectral estimator 771. The output signal of limiter 772 is outputted through terminal 799 to inverse Fourier transformer 64 shown in FIG. 9.

Next, spectral estimator 771 shown in FIG. 12 will be described with reference to FIG. 13.

Figure 13:
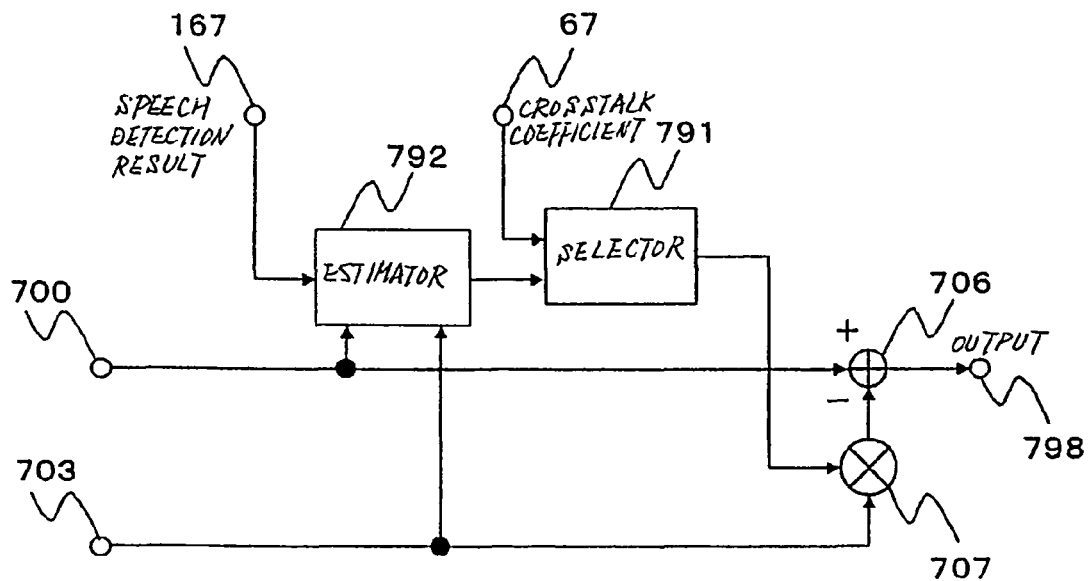
FIG. 13 is a block diagram showing an exemplary configuration of the spectral estimator shown in FIG. 12.

FIG. 13 is a block diagram showing an exemplary configuration of the spectral estimator shown in FIG. 12.

As shown in FIG. 13, spectral estimator 771 includes estimator 791, estimator 792, subtractor 706, and multiplier 707.

The first Fourier coefficient inputted through terminal 700 shown in FIG. 12 is supplied to subtractor 706 and estimator 792. The second Fourier coefficient inputted through terminal 703 shown in FIG. 12 is supplied to multiplier 707 and estimator 792.

Estimator 792 uses the speech detection result inputted through terminal 167, the first Fourier coefficient, and the second Fourier coefficient inputted through terminal 703 to calculate an estimated crosstalk value of the echo, and outputs the calculated estimated crosstalk value to selector 791.

To calculate an estimated crosstalk value of the echo, for example, the method described in the third example of related art may be used. That is, the estimated crosstalk value can be the ratio of the value corresponding to the amplitude or power of the first signal to the value corresponding to the amplitude or power of the second signal during the period in which no near-end audio is detected in the output signal of the microphone. Alternatively, the estimated crosstalk value can be a smoothed value of the ratio.

Still alternatively, the estimated crosstalk value can be obtained by calculating the ratio of the value obtained by smoothing the value corresponding to the amplitude or power of the first signal to the value obtained by smoothing the value corresponding to the amplitude or power of the second signal during the period in which no near-end audio is detected in the output signal of the microphone and further smoothing the ratio.

The time constant of the process of smoothing the value corresponding to the amplitude or power of each of the first and second signals may be controlled in such a way that the time constant for the first and second signals that increase is smaller than the time constant for the first and second signals that decrease.

The time constant of the process of smoothing the ratio is preferably controlled in such a way that the time constant is large or infinite when the near-end audio is detected, otherwise the time constant is small. Alternatively, the time constant may be controlled in such a way that the time constant for the case where the near-end audio is detected is much larger than the time constant for the case where the near-end audio is not detected, and at the same time in such a way that the time constant is small when the near-end audio is not detected or the time constant for the case where the ratio increases is smaller than the time constant for the case where the ratio decreases.

Selector 791 selects either the crosstalk coefficient inputted through terminal 67 or the value calculated in estimator 792, and outputs the selected value as the estimated crosstalk value of echo to multiplier 707.

Selector 791 may select only one of the above two inputs or may switch between the two inputs and output the selected one. As a method for selecting the estimated crosstalk value in selector 791, for example, the value calculated in estimator 792 is selected when the near-end audio or the near-end noise, if any, is greater than or equal to a predetermined threshold value, otherwise the crosstalk coefficient inputted through terminal 67 is selected.

Multiplier 707 multiplies the amplitude of the second Fourier coefficient inputted through terminal 703 by the estimated crosstalk value outputted from selector 791, and outputs the computation result as the estimated value of the echo to subtractor 706.

Subtractor 706 subtracts the estimated value of the echo outputted from multiplier 707 from the first Fourier coefficient inputted through terminal 700, and outputs the computation result through terminal 798 as the estimated value of the Fourier coefficient for the signal with the echo suppressed. The estimated value of the Fourier coefficient outputted through terminal 798 is outputted to limiter 772 shown in FIG. 10.

Next, noise estimator 778 shown in FIG. 12 will be described with reference to FIG. 14.

Figure 14:
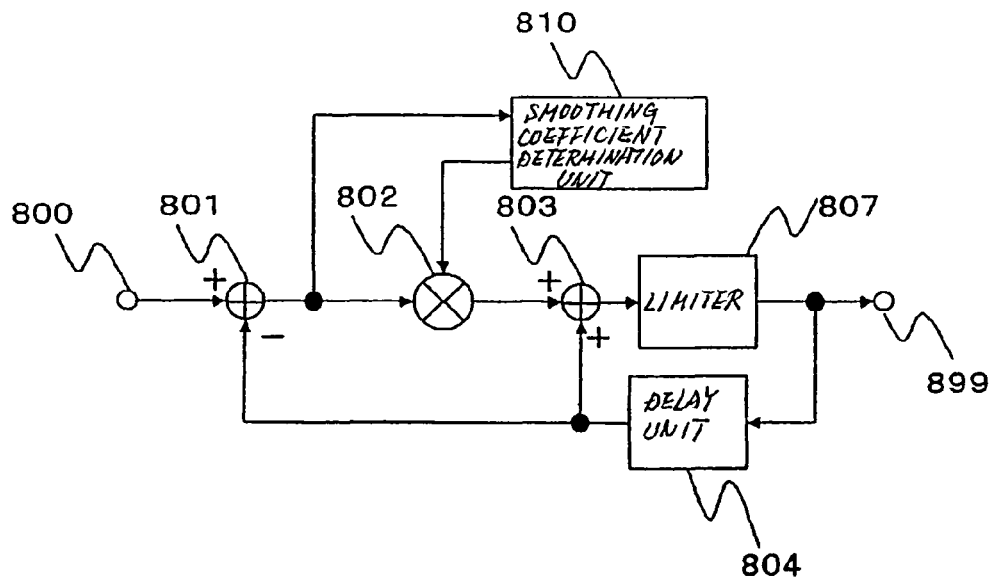
FIG. 14 is a block diagram showing an exemplary configuration of the noise estimator shown in FIG. 12.

FIG. 14 is a block diagram showing an exemplary configuration of the noise estimator shown in FIG. 12.

As shown in FIG. 14, noise estimator 778 includes subtractor 801, multiplier 802, adder 803, retarder 804, limiter 807, and smoothing coefficient determination unit 810.

As shown in FIG. 14, noise estimator 778 receives the first Fourier coefficient outputted from Fourier transformer 60 through terminal 800.

Subtractor 810 subtracts the output signal of retarder 804 (the output signal of noise estimator 778) from the first Fourier coefficient and outputs the computation result to smoothing coefficient determination unit 810 and multiplier 802. Multiplier 802 multiplies the output signal of subtractor 801 by the output signal of smoothing coefficient determination unit 810 and outputs the computation result to adder 803. Adder 803 adds the output signal of multiplier 802 to the output signal of retarder 804 and outputs the computation result to limiter 807. Limiter 807 sets the upper and lower limits of the output signal of adder 803 in such a way that the output signal does not exceed a predetermined range set in advance and outputs the limited signal to output terminal 899 and retarder 804. Retarder 804 retards the output signal of limiter 807 by one sampling time and outputs the retarded output signal to subtractor 801 and adder 803.

Noise estimator 778 shown in FIG. 14 has a configuration called a leaky integrator or a first-order IIR-type lowpass filter. However, in noise estimator 778 shown in FIG. 14, the coefficient that determines the time constant of estimator 778 is not a constant but a variable supplied from smoothing coefficient determination unit 810. The smoothing coefficient is inversely proportional to the time constant of the smoothing process. Smoothing coefficient determination unit 810 outputs a relatively small coefficient, for example, 0.01, when the output signal of subtractor 801 is positive, that is, when the output signal of subtractor 801 increases, whereas outputting a relatively large coefficient, for example, 0.5, when the output value of subtractor 801 is negative, that is, when the output signal of subtractor 801 decreases.

By thus controlling the smoothing coefficient, the rate at which the output signal of noise estimator 778 increases, that is, the rising rate decreases, whereas the rate at which the output signal of noise estimator 778 decreases, that is, the falling rate increases. Therefore, among the signals inputted to noise estimator 778, the amplitude value of a stationary signal component having a low signal level is outputted. The stationary component is namely near-end noise, and the output signal of noise estimator 778 can be considered as an estimated value (amplitude value) of the near-end noise.

Limiter 772 shown in FIG. 12 compares, for example, the estimated value of the Fourier coefficient for the signal with the echo suppressed, which is outputted from spectral estimator 771, with the estimated value of the Fourier coefficient for the near-end noise, which is outputted from noise estimator 778, and output the larger one of the two values. Other examples of the configuration of limiter 772 will be described later.

The operation of Fourier coefficient subtractor 66m shown in FIG. 12 will be described by using equations.

First, the operation will be described for the case where the value calculated in estimator 792 is used as the estimated crosstalk value.

Let S be the Fourier coefficient for the near-end signal, A be the near-end audio signal component contained in the near-end signal, E be the echo component, and N be the noise component. These parameters satisfy the following relationship:

$$S=A+E+N \tag{1}$$

Let R be the Fourier coefficient for the far-end signal. The phase of R can be considered to be substantially the same as the phase of echo component E because their temporal axes coincide with each other.

When no near-end audio signal component A is present, that is, there is no near-end audio, near-end signal S equals E+N, which are signals that should be removed altogether. Consider using Fourier coefficient R for the far-end signal to estimate signal E+N and subtracting E+N from the near-end signal when there is near-end audio. The speech detection result is used to smooth S/R when there is no near-end audio, and P1 is obtained as follows:

$$P1=Av[S/R]=Av[(E+N)/R] \tag{2}$$

where Av[·] represents a smoothing process.

P1 represents an approximate value of the portion of far-end signal R that leaks into the near-end signal as an echo, and corresponds to the gain of the echo in the echo path.

Therefore, multiplying P1 by R provides value P2 (corresponding to the output signal of multiplier 707), which is an estimated value of the echo component and noise component.

$$\begin{aligned} P2 &= P1 \times R \\ &= R \times Av[(E+N)/R] \\ &= Ex[E+N] \end{aligned} \tag{3}$$

where Ex[·] represents an estimated value.

Subtracting P2 from S provides value P3 (corresponding to the output signal of subtractor 706).

$$
\begin{aligned}
P3 &= S - P2 \\
&= S - (R \times Av[(E+N)/R]) \\
&= (A+E+N) - Ex[E+N] \\
&= Ex[A]
\end{aligned}
\tag{4}
$$

That is, output signal P3 of subtractor 706 is Fourier coefficient component A for the near-end audio from which echo component E and noise component N have been removed.

Next, the operation of Fourier coefficient subtractor 66m will be described for the case where the crosstalk coefficient generated in coefficient generator 200 is used as the estimated crosstalk value of the echo.

As described above, let S be the Fourier coefficient for the near-end signal, A be the near-end audio signal component contained in the near-end signal, E be the echo component, and N be the noise component. These values satisfy the equation (1) described above.

Let R be the Fourier coefficient for the far-end signal, and P1 be the value of the crosstalk coefficient. Crosstalk coefficient P1 is an approximate value of the portion of far-end signal R that leaks into the near-end signal as an echo, and corresponds to the gain of the echo in the echo path.

Therefore, multiplying P1 by R provides value P2 (corresponding to the output signal of multiplier 707), which is an estimated value of the echo component.

$$
\begin{aligned}
P2 &= P1 \times R \\
&= Ex[E]
\end{aligned}
\tag{3'}
$$

Subtracting P2 from S then provides value P3 (corresponding to the output signal of subtractor 706).

$$
\begin{aligned}
P3 &= S - P2 \\
&= S - P1 \times R \\
&= (A+E+N) - Ex[E] \\
&= Ex[A+N]
\end{aligned}
\tag{4'}
$$

That is, the output signal P3 of subtractor 706 is an estimated value of the sum of Fourier coefficient component A and noise component N for the near-end audio from which echo component E is removed.

As described above, in an ideal condition, the estimated crosstalk value calculated in estimator 792 can be used to remove echo component E and noise component N, whereas the crosstalk coefficient generated in coefficient generator 200 can be used to remove echo component E.

However, in practice, the estimated crosstalk value calculated in estimator 792 may not be correct due to, for example, a wrong speech detection result. Similarly, the crosstalk coefficient generated in coefficient generator 200 may be wrong due to, for example, wrong selection of the use condition. In such a case, the echo will not be sufficiently suppressed and a large amount of distortion is generated in the near-end signal (near-end audio+near-end noise), resulting in a phenomenon in which the near-end signal is modulated by the far-end signal. In particular, use of the estimated crosstalk value calculated in estimator 792, which attempts to suppress noise component N as well, results in a phenomenon in which the near-end signal is modulated by the far-end signal in a more significant manner. Such a phenomenon can be mitigated by using limiter 772 as described below.

For example, when there is no limiter 772 shown in FIG. 12 and P1×R described above does not sufficiently approximate echo component E, distortion is generated in A+N. The distortion is audible as a modulated sound of noise component N, resulting in a disturbing sound.

In such a situation, in an equation P3=A+N+(E−Ex[E]), which is equivalent to the third row of the equation (4'), when near-end audio A is small and (E−Ex[E]) is comparable to noise component N, the value of P3 becomes much smaller than the value of noise component N in some cases, and noise component N is perceived as if it were modulated.

On the other hand, when there is limiter 772, output value P4 of limiter 772 can be expressed as follows:

$$
P4 = \text{Max}(A+N+E-Ex[E], Ex[N]) \geq Ex[N] \tag{5}
$$

where Max(a, b) represents the operation of selecting the larger one of a and b.

As shown in equation (5), output value P4 of limiter 772 is always greater than Ex[N]. Therefore, output value P4 of limiter 772 will not be smaller than noise component N, so that the modulated sound of noise component N is reduced.

The echo suppressing apparatus of the first exemplary embodiment is provided with linear echo canceller 3 and a nonlinear operation for frequency ranges performed in spectral subtractor 6, which complement each other and hence provides sufficient echo removal capability.

That is, even when linear echo canceller 3 alone cannot sufficiently suppress an echo, for example, when the echo path generates distortion, or when the echo path estimation performed by linear echo canceller 3 is wrong, spectral subtractor 6 can suppress the echo.

Further, by using the output signal of linear echo canceller 3 to correct the output signal of the microphone, the harmonic wave component responsible for distortion can be suppressed without considering the temporal shift that a nonlinear operation for frequency ranges performed by spectral subtractor 6 alone cannot handle but using a simple estimation that uses only the amplitude value.

Further, by using limiter 807 to limit estimated value Ex[N] of the near-end noise, the modulated sound of the near-end noise can be reduced.

Moreover, by setting crosstalk coefficient P1 used in spectral subtractor 6 to a constant that is set in advance according to use conditions, an echo can be sufficiently suppressed even when the use conditions are changed, for example, in an environment in which high-level near-end noise is present, and in which near-end audio with less distortion is provided.

Second Exemplary Embodiment

Figure 15:
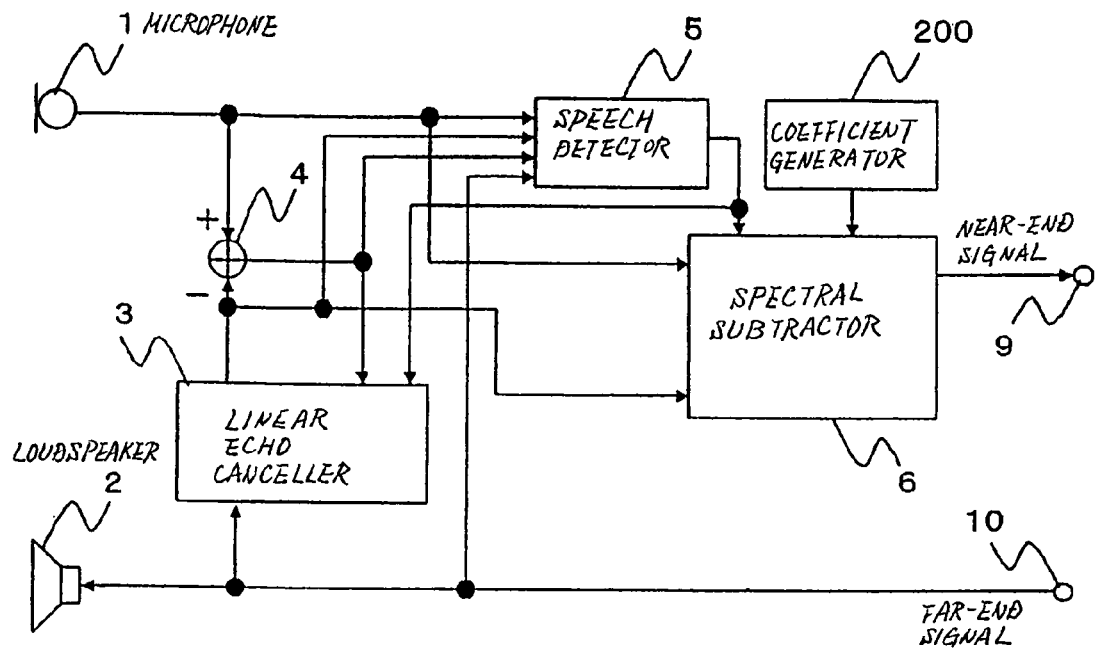
FIG. 15 is a block diagram showing the configuration of a second exemplary embodiment of the echo suppressing apparatus according to the present invention.

FIG. 15 is a block diagram showing the configuration of a second exemplary embodiment of the echo suppressing apparatus according to the present invention.

The echo suppressing apparatus of the second exemplary embodiment differs from the echo suppressing apparatus of the first exemplary embodiment in that spectral subtractor 6 receives the output signal of microphone 1 instead of the output signal of subtractor 4.

In the echo suppressing apparatus of the first exemplary embodiment, linear echo canceller 3 removes the primary component of the echo, whereas in the echo suppressing apparatus of the second exemplary embodiment, spectral subtractor 6 removes the primary component of the echo. Except for the above configuration and operation, the second exemplary embodiment is the same as the first exemplary embodiment, and the removal of the echo resulting from distortion is advantageously carried out as in the first exemplary embodiment.

Therefore, in the echo suppressing apparatus of the second exemplary embodiment as well, spectral subtractor 6 can sufficiently suppress the echo even when linear echo canceller 3 alone cannot sufficiently suppress the echo, for example, when the acoustic transfer system generates distortion or when the echo path estimation performed by linear echo canceller 3 is wrong, as in the first exemplary embodiment. Further, by setting estimated crosstalk value P1 used in spectral subtractor 6 to a constant that is set in advance according to use conditions, the echo can be sufficiently suppressed even when the use conditions are changed in an environment in which high-level near-end noise is present, and in which near-end audio with less distortion is provided. Moreover, the modulated sound of the near-end noise can be reduced.

Spectral subtractor 6 is not necessarily configured as shown in the first and second exemplary embodiments, but may use, for example, spectral subtraction described in Non-Patent Document 2 (Xiaojian Lu and Benoit Champagne, "Acoustical Echo Cancellation Over A Non-Linear Channel", International Workshop on Acoustic Echo and Noise Control 2001) or spectral subtraction described in Non-Patent Document 3 (A. Alvarez et al., "A Speech Enhancement System Based On Negative Beamforming And Spectral Subtraction", International Workshop on Acoustic Echo and Noise Control 2001).

Third Exemplary Embodiment

Figure 16:
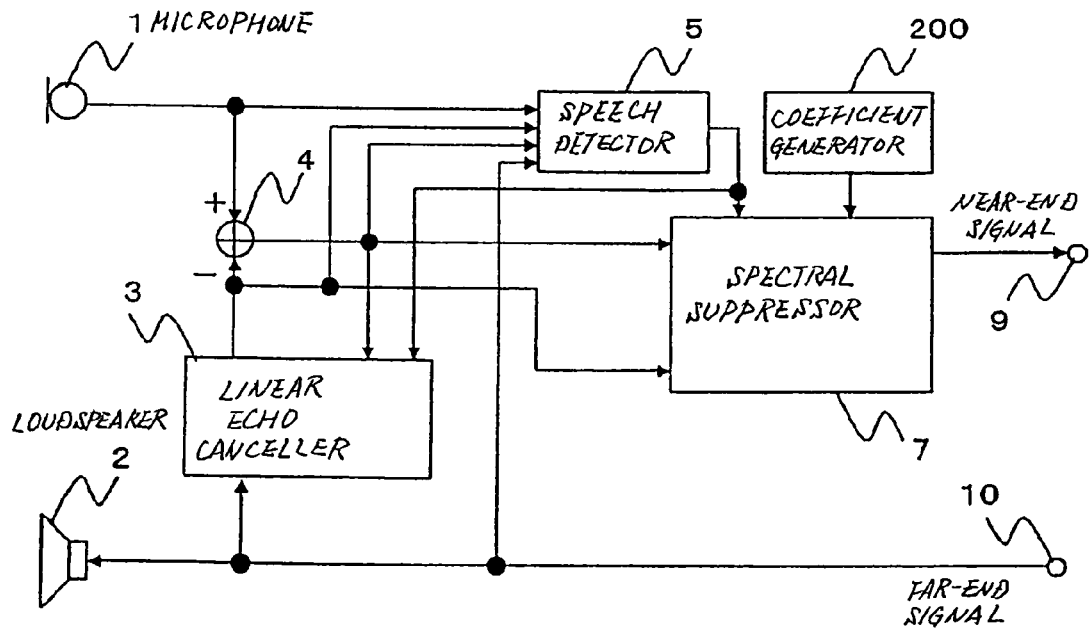
FIG. 16 is a block diagram showing the configuration of a third exemplary embodiment of the echo suppressing apparatus according to the present invention.

FIG. 16 is a block diagram showing the configuration of a third exemplary embodiment of the echo suppressing apparatus according to the present invention.

The echo suppressing apparatus of the third exemplary embodiment differs from the echo suppressing apparatus of the first exemplary embodiment in that spectral subtractor 6 shown in FIG. 8 is replaced with spectral suppressor 7. Except the above configuration and operation, the third exemplary embodiment is the same as the first exemplary embodiment. A detailed description of the common portions will therefore be omitted.

Spectral suppressor 7 shown in FIG. 16 will be described below with reference to the corresponding Figs.

Figure 17:
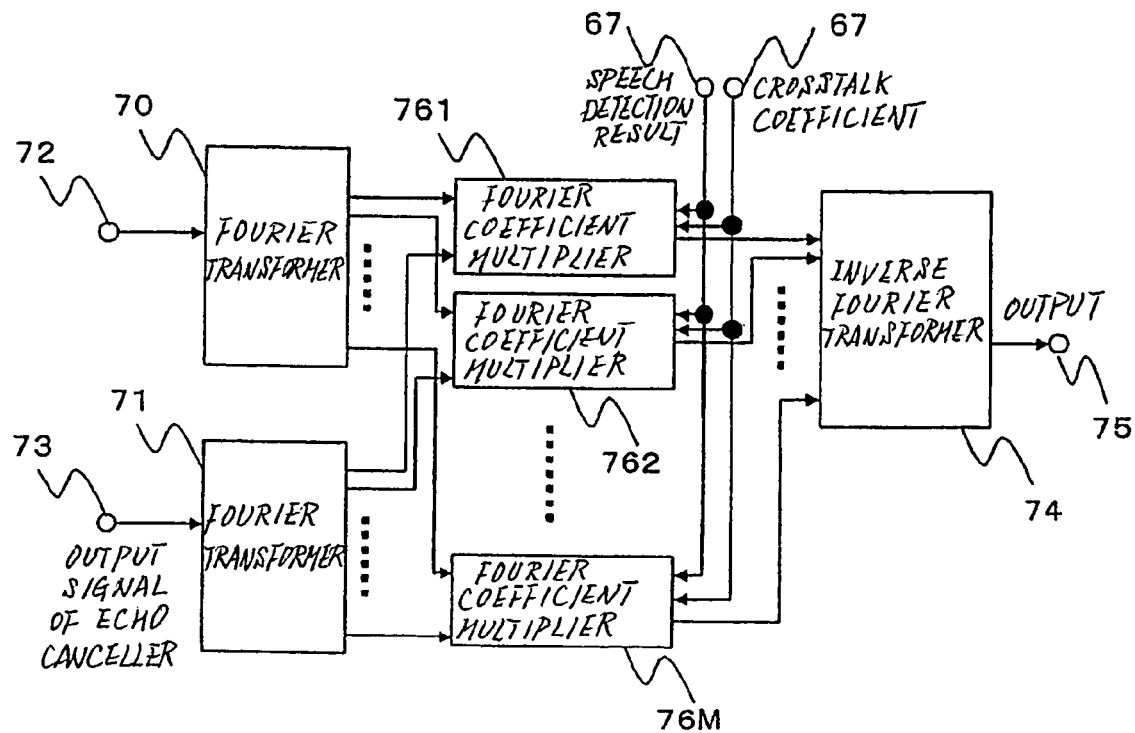
FIG. 17 is a block diagram showing an exemplary configuration of the spectral suppressor shown in FIG. 16.

FIG. 17 is a block diagram showing an exemplary configuration of the spectral suppressor shown in FIG. 16.

As shown in FIG. 17, spectral suppressor 7 includes Fourier transformers 70 and 71, Fourier coefficient multipliers 76*m* (m=1 to M), and inverse Fourier transformer 74.

Fourier transformer 70 carries out M-point Fourier transformation on the output signal of subtractor 4 shown in FIG. 16, which is inputted through terminal 72, and outputs the processed results (amplitude and phase) as first Fourier coefficients to Fourier coefficient multipliers 76*m* (m=1 to M) corresponding to the respective frequency ranges.

Fourier transformer 71 carries out M-point Fourier transformation on the output signal (echo replica signal) of linear echo canceller 3 shown in FIG. 16, which is inputted through terminal 73, and outputs the processed results (amplitude and phase) as second Fourier coefficients to Fourier coefficient multipliers 76*m* corresponding to the respective frequency ranges.

Each of Fourier coefficient multipliers 76*m* receives the first Fourier coefficient outputted from Fourier transformer 70, the second Fourier coefficient outputted from Fourier transformer 71, the crosstalk coefficient outputted from coefficient generator 200 shown in FIG. 16, which is inputted through terminal 67, and the speech detection result outputted from speech detector 5 shown in FIG. 16, which is inputted through terminal 167, carries out multiplication operations using the amplitude components of the received signals to calculate a Fourier coefficient, and outputs the calculation result (amplitude and phase) to inverse Fourier transformer 74.

Inverse Fourier transformer 74 carries out inverse Fourier transformation on the group of Fourier coefficients outputted from Fourier coefficient multipliers 76*m* (m=1 to M), and outputs the real part of the processed result from terminal 75. In the configuration shown in FIG. 17, a near-end signal with a suppressed echo component is obtained by Fourier coefficient multipliers 76*m* (m=1 to M).

The configuration and operation of each of Fourier coefficient multipliers 76*m* (m=1 to M) will be described with reference to FIG. 18.

Figure 18:
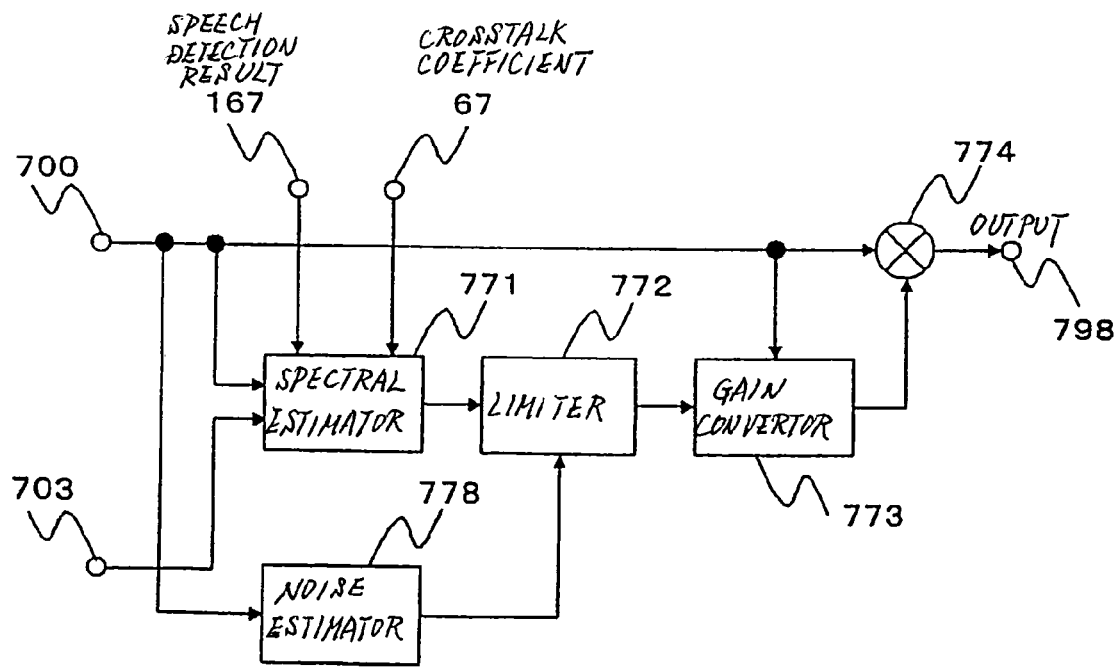
FIG. 18 is a block diagram showing a first exemplary configuration of the Fourier coefficient multiplier shown in FIG. 17.

FIG. 18 is a block diagram showing a first exemplary configuration of one of the Fourier coefficient multipliers shown in FIG. 17.

As shown in FIG. 18, Fourier coefficient multiplier 76*m* having the first exemplary configuration includes spectral estimator 771, noise estimator 778, limiter 772, gain converter 773, and multiplier 774.

The first Fourier coefficient for the corresponding frequency range outputted from Fourier transformer 70 shown in FIG. 17 is supplied to spectral estimator 771 and noise estimator 778 through terminal 700.

The second Fourier coefficient outputted from Fourier transformer 71 shown in FIG. 17 is supplied to spectral estimator 771 through terminal 703. The crosstalk coefficient generated in coefficient generator 20 is supplied to spectral estimator 771 through terminal 67, and the speech detection result outputted from speech detector 5 is supplied to spectral estimator 771 through terminal 167.

Spectral estimator 771 removes the echo component in the first Fourier coefficient supplied through terminal 700 and outputs the computation result to limiter 772. Noise estimator 778 uses the first Fourier coefficient supplied through terminal 700 to estimate the value of the near-end noise and outputs the estimation result to limiter 772.

Limiter 772 uses the estimated value of the near-end noise received from noise estimator 778 to set the lower limit for the signal received from spectral estimator 771. The output signal of limiter 772 is outputted to gain converter 773.

The error in the output signal of limiter 772 (the estimated value of the near-end audio and near-end noise after echo suppression) is generally called musical noise. Gain converter 773 is provided to reduce the musical noise, for example, by smoothing the output signal of the limiter.

Multiplier 774 multiplies the output signal of gain converter 773 by the first Fourier coefficient inputted through terminal 700 and outputs the computation result through terminal 798.

Gain converter 773 shown in FIG. 18 will be described with reference to the corresponding Figs.

Figure 19:
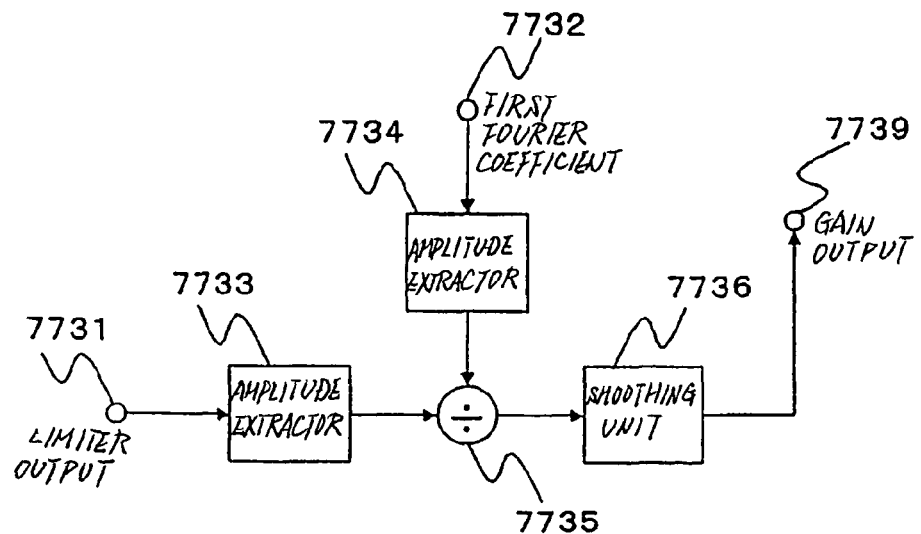
FIG. 19 is a block diagram showing an exemplary configuration of the gain converter shown in FIG. 18.

FIG. 19 is a block diagram showing an exemplary configuration of the gain converter shown in FIG. 18.

As shown in FIG. 19, gain converter 773 includes amplitude extractors 7733 and 7734, divider 7735, and smoothing unit 7736.

The output signal of limiter 772 shown in FIG. 18 is inputted to amplitude extractor 7733 through terminal 7731. The first Fourier coefficient inputted through terminal 700 shown in FIG. 18 is inputted to amplitude extractor 7734 through terminal 7732.

Each of amplitude extractors 7733 and 7734 detects the amplitude value of the input signal and outputs the detection result to divider 735. Divider 7735 divides the output signal of amplitude extractor 7733 by the output signal of amplitude extractor 7734 and outputs the computation result to smoothing unit 7736. Smoothing unit 7736 smoothes the output signal of divider 7735 and outputs the smoothed signal to multiplier 774 shown in FIG. 18 through terminal 7739. Smoothing unit 7736 can be configured in a manner similar to noise estimator 778 shown in FIG. 14 except that, for example, the smoothing coefficient generated in smoothing coefficient determination unit 810 is different.

Smoothing unit 7736, if configured as shown in FIG. 14, can use the value of the smoothing coefficient to reduce the rate at which the output signal of smoothing unit 7736 increases, that is, the rising rate, and increase the rate at which the output signal of smoothing unit 7736 decreases, that is, the falling rate.

In general, the change in amplitude, that is, the envelope characteristic of audio or music, is characterized in that the rising rate is large and the falling rate is small in many cases. The use of the configuration shown in FIG. 14 allows such an envelope characteristic to be provided, so that the proportion of the near-end audio and near-end noise contained in the near-end signal can be estimated with better accuracy.

The output value of smoothing unit 7736 will be described by using equations.

Dividing the whole second row of equation (4') used in the description of Fourier coefficient subtractor 66m described above by S provides smoothed value P5, which is expressed by the following equation (6). The right hand of the first row of equation (6) corresponds to the output value of smoothing unit 7736 shown in FIG. 19.

$$P5 = Av[\text{Max}((S-P1 \times R)/Av[S], Ex[N]/Av[S])] \quad \text{Equation (6)}$$

where Max(a, b) represents the operation of selecting the larger one of a and b.

When limiter 772 shown in FIG. 18 is not in operation, the left term is selected in the selecting operation in equation (6). Therefore, P5 is expressed as follows:

$$P5 = Av[(S - P1 \times R)/Av[S]] \quad (7)$$
$$= Av[A + E + N) - Ex[E])/Av[S]]$$
$$= Av[Ex[A + N]/Av[S]]$$
$$= Ex[(A + N)/S]$$

Equation (7) shows that output value P5 of smoothing unit 7736 is an estimated value of the proportion of the near-end audio and near-end noise contained in the near-end signal.

It is therefore found that spectral suppressor 7 shown in FIG. 17 provides near-end audio and near-end noise with the echo suppressed.

On the other hand, when limiter 772 shown in FIG. 18 is in operation, the right term is selected in the selecting operation in equation (6). Therefore, P5 is expressed as follows:

$$P5 = Av[Ex[N]/Av[S])] \quad (8)$$
$$= Ex[N/S]$$

$$P5 = Av[Ex[N]/Av[S])] = Ex[N/S] \quad (8)$$

Equation (8) shows that output value P5 of smoothing unit 7736 is an estimated value of the proportion of the near-end noise contained in the near-end signal.

It is therefore found that spectral suppressor 7 shown in FIG. 17 again provides near-end audio and near-end noise with the echo suppressed.

Figure 20:
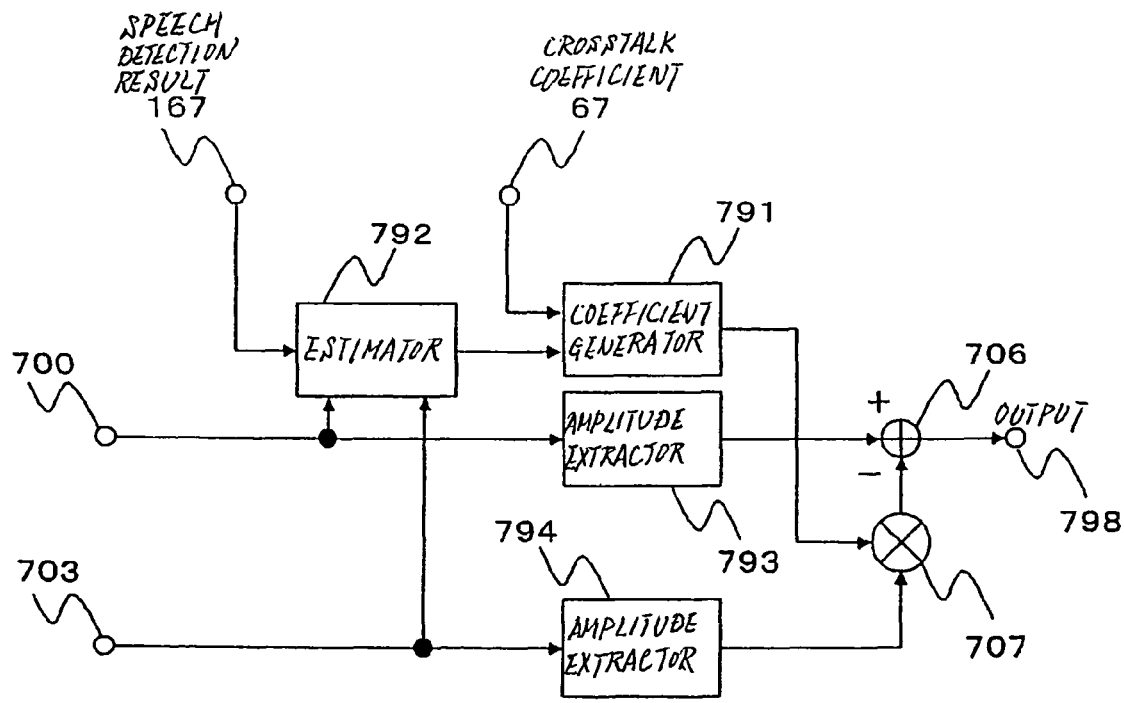
FIG. 20 is a block diagram showing a second exemplary configuration of the spectral estimator shown in FIG. 18.

FIG. 20 is a block diagram showing a second exemplary configuration of the spectral estimator shown in FIG. 18.

Spectral estimator 771 shown in FIG. 20 includes estimator 792, coefficient generator 791, amplitude extractors 793 and 794, subtractor 706, and multiplier 707.

Spectral estimator 771 shown in FIG. 20 differs from the spectral estimator shown in FIG. 13 in that amplitude extractor 793 is inserted in the path from terminal 700 to subtractor 706 and amplitude extractor 794 is inserted in the path from terminal 703 to multiplier 707.

Amplitude extractor 793 detects the amplitude of the input signal and outputs the detected value. Amplitude extractor 793 can be configured as shown in FIGS. 21 and 22.

Figure 21:
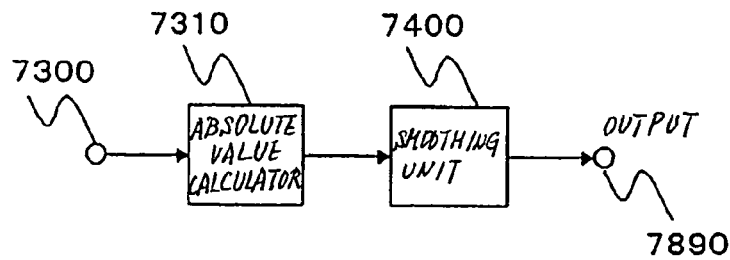
FIG. 21 is a block diagram showing an exemplary configuration of the amplitude extractor shown in FIG. 20.
Figure 22:
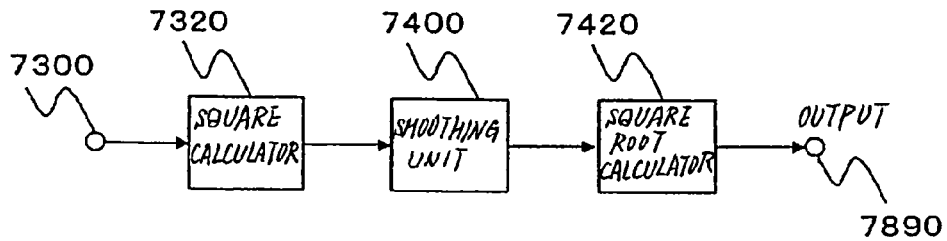
FIG. 22 is a block diagram showing another exemplary configuration of the amplitude extractor shown in FIG. 20.

FIG. 21 is a block diagram showing an exemplary configuration of the amplitude extractor shown in FIG. 20, and FIG. 22 is a block diagram showing another exemplary configuration of the amplitude extractor shown in FIG. 20.

Amplitude extractor 793 shown in FIG. 21 includes absolute value calculator 7310 that calculates the absolute value of the input signal and smoothing unit 7400 that smoothes the output signal of absolute value calculator 7310 and outputs the smoothed value. On the other hand, amplitude extractor shown in FIG. 22 includes square calculator 7320 that calculates the square of the input signal, smoothing unit 7400 that smoothes the output signal of square calculator 7320, and square root calculator 7420 that calculates the square root of the output signal of smoothing unit 7400 and outputs the calculation result. Amplitude extractor 794 is configured in the same manner as amplitude extractor 793.

In such a configuration, output value P6 of smoothing unit 7736 is expressed as follows:

$$P6 = Av[\text{Max}((Av[S] - P1 \times Av[R])/Av[S], Ex[N]/Av[S])] \quad (9)$$

Therefore, when limiter 772 shown in FIG. 18 is not in operation, P6 is expressed as follows:

$$P6 = Av[(Av[S] - P1 \times Av[R])/Av[S]] \quad (10)$$
$$= Av[(Av[(A + E + N) - Ex[E])/Av[S]]$$
$$= Av[Ex[A + N]/Av[S]]$$
$$= Ex[(A + N)/S]$$

The equation (10) shows that output value P6 of smoothing unit 7736 is, as in P5 shown in equation (7), an estimated value of the proportion of the near-end audio and near-end noise contained in the near-end signal. It is therefore found that spectral suppressor 7 shown in FIG. 17 provides near-end audio and near-end noise with the echo suppressed even when spectral estimator 771 is configured as shown in FIG. 20.

Fourth Exemplary Embodiment

Figure 23:
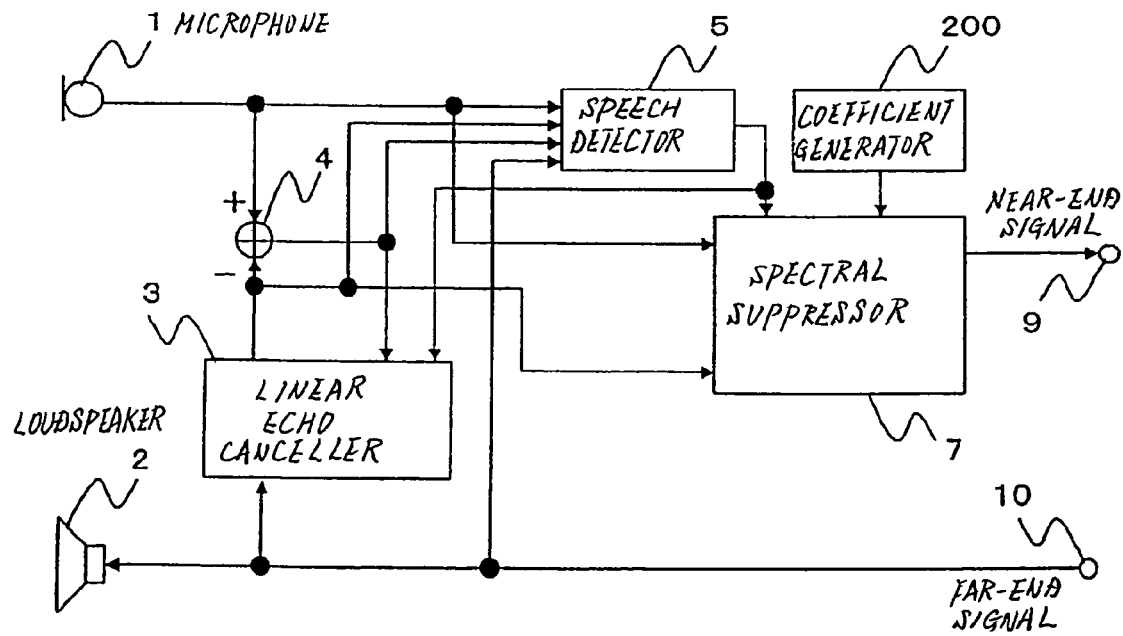
FIG. 23 is a block diagram showing the configuration of a fourth exemplary embodiment of the echo suppressing apparatus according to the present invention.

FIG. 23 is a block diagram showing the configuration of a fourth exemplary embodiment of the echo suppressing apparatus according to the present invention.

The echo suppressing apparatus of the fourth exemplary embodiment differs from the echo suppressing apparatus of the third exemplary embodiment shown in FIG. 16 in that spectral suppressor 7 receives the output signal of microphone 1 instead of the output signal of subtractor 4.

Therefore, in the echo suppressing apparatus of the third exemplary embodiment, linear echo canceller 3 removes the primary component of the echo, whereas in the echo suppressing apparatus of the fourth exemplary embodiment, spectral suppressor 7 removes the primary component of the echo.

Except the above configuration and operation, the fourth exemplary embodiment is the same as the third exemplary embodiment, and the same advantage is provided as in the third exemplary embodiment.

While the exemplary embodiments of the present invention have been described, the present invention is not limited to the first to fourth exemplary embodiments described above, but the following various changes can be made.

In the first to fourth examples of related art, each of limiters 772 shown in FIGS. 12 and 18 has a simple configuration, by way of example, in which the larger one of two input values is selected. However, limiter 772 may be configured in any other manner as long as the signal output of limiter 772 is not smaller than the estimated value of the near-end noise. For example, when P3 described above is greater than estimated value Ex[N] of the near-end noise, limiter 772 may be configured to make selection by using a function whose output increases as P3 approaches the estimated value of the near-end noise.

Also, in the first to fourth examples of related art, although the description has been made with reference to the case where spectral subtractor 6 and spectral suppressor 7 carry out Fourier transformation for each predetermined sampling period, the Fourier transformation is not necessarily carried out for each predetermined sampling period, but may be carried out on a fixed-interval frame basis.

Further, the Fourier transformation can be carried out in such a way that frames overlap each other. In this case, the amount of computation can be reduced by using an overlap-save method or an overlap-add method. An overlap-save method and an overlap-add method are described, for example, in Non-Patent Document 4 (John J. Shynk, "Frequency-Domain and Multirate Adaptive Filtering", IEEE Signal Processing Magazine, January 1992, pp. 14-37).

In the first to fourth examples of related art, although the description has been made with reference to the case where spectral subtractor 6 and spectral suppressor 7 carry out Fourier transformation, Fourier transformation can be replaced with other linear transformation methods, such as cosine transformation and a filter bank, and the process can even be carried out after subband-domain transformation. In this case, the subtractors and multipliers for Fourier coefficients may be changed to correspond to the linear transformation to be used. For example, when cosine transformation is used, subtractors for cosine coefficients and multipliers for cosine coefficients may be used. The operation of each of such computation devices is the same as the operation for Fourier transformation used as the linear transformation in the first to fourth examples of related art described above.

Fifth Exemplary Embodiment

While in the first to fourth exemplary embodiments, linear echo canceller 3 is used by way of example, a transform-domain echo canceller can be used to suppress an echo. In this case, the amount of computation in the entire echo suppressing apparatus can be reduced and the delay time associated with the computation can be shortened by setting the transform-domain of the transform-domain echo canceller to the same transform-domain as that of subtractor 6 or spectral suppressor 7 described above.

The transform-domain echo canceller herein refers to an echo canceller that suppresses an echo in a transform-domain expanded by using linear transformation and that carries out resynthesis in the original domain by using inverse linear transformation.

As the transform-domain echo canceller, the following description will be made, for example, with reference to a Fourier transform-domain echo canceller described in Non-Patent Document 4.

Figure 24:
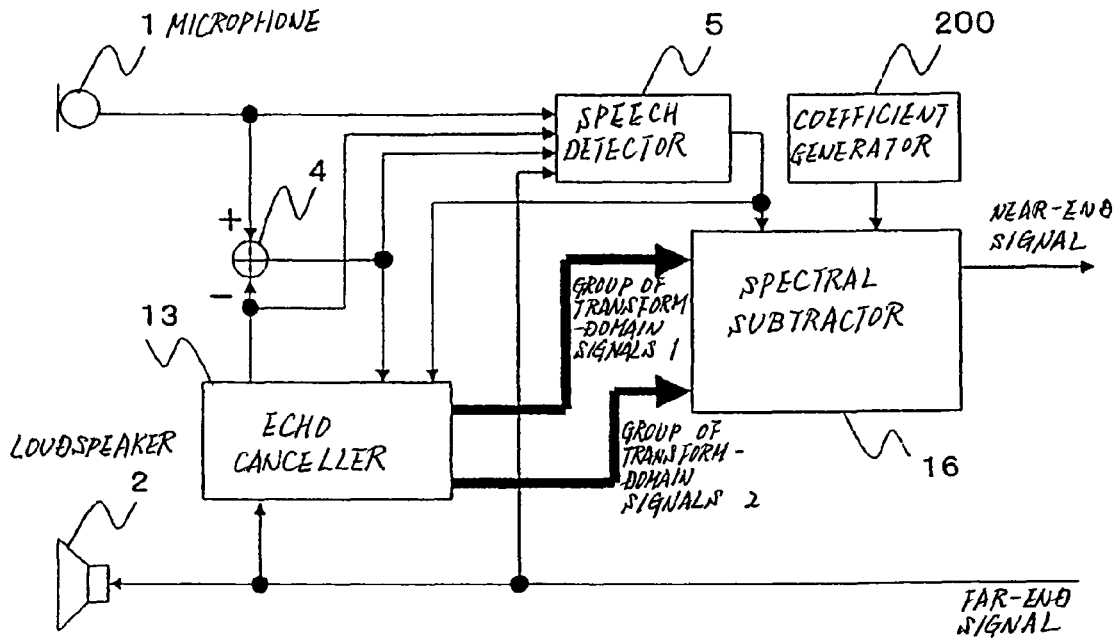
FIG. 24 is a block diagram showing the configuration of a fifth exemplary embodiment of the echo suppressing apparatus according to the present invention.

FIG. 24 is a block diagram showing the configuration of a fifth exemplary embodiment of the echo suppressing apparatus according to the present invention.

The echo suppressing apparatus of the fifth exemplary embodiment is configured in such a way that echo canceller 13 and spectral subtractor 16 carry out processing in a Fourier transform-domain. Echo canceller 13 outputs a group of transform-domain signals 1 and a group of transform-domain signals 2 to spectral subtractor 16.

Figure 25:
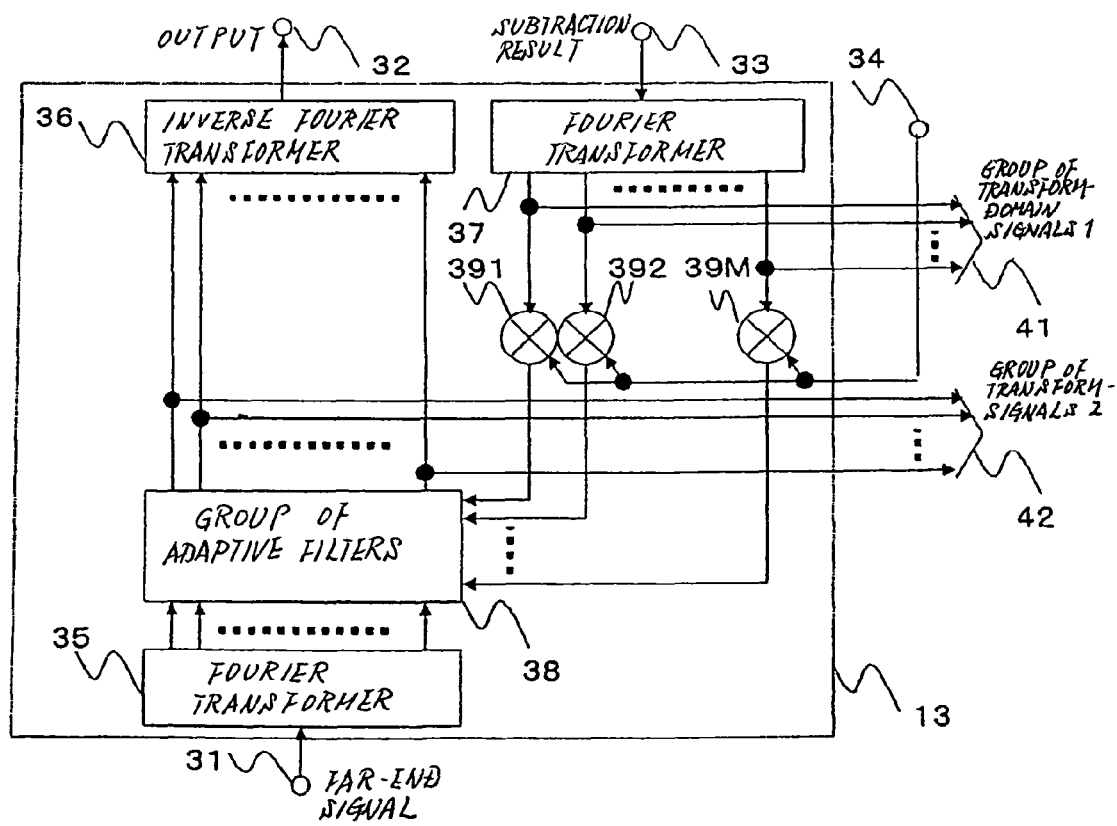
FIG. 25 is a block diagram showing an exemplary configuration of the echo canceller shown in FIG. 24.

FIG. 25 is a block diagram showing an exemplary configuration of the echo canceller shown in FIG. 24.

Echo canceller 13 shown in FIG. 25 includes Fourier transformer 35, a group of adaptive filters 38, inverse Fourier transformer 36, Fourier transformer 37, and multipliers 39$m$ ($m=1$ to M).

The far-end signal inputted to terminal 31 is expanded by Fourier transformer 35 in a Fourier transform-domain and the expanded signals for respective frequency ranges are outputted to the group of adaptive filters 38. The subtraction result inputted from subtractor 4 shown in FIG. 24 through terminal 33 is expanded by Fourier transformer 37 in the Fourier transform-domain, and the expanded signals for the respective frequency ranges are outputted to multipliers 39$m$ ($m=1$ to M).

Multipliers 39$m$ ($m=1$ to M) multiply the signals received from Fourier transformer 37 by the speech detection result received through terminal 34 and output the computation results to the group of adaptive filters 38.

The group of adaptive filters 38, which include M adaptive filters, receive a group of signals 2 outputted from Fourier transformer 35 and a group of signals 1 outputted from multipliers 39$m$ ($m=1$ to M) and performs adaptive filtering on signals that correspond to each other. The filtered outputs obtained by adaptive filtering are outputted to inverse Fourier transformer 36.

Inverse Fourier transformer 36 performs inverse Fourier transformation on the filtered outputs obtained from the group of adaptive filters 38 and outputs the processed result from terminal 32. The signal outputted from terminal 32 is the output signal from the echo canceller.

Echo canceller 13 also outputs the output signals of Fourier transformer 37 as a group of transform-domain signals 1 from vector output terminal 41. Echo canceller 13 also outputs the outputs of the group of adaptive filters 38 as a group of transform-domain signals 2 from vector output terminal 42. The group of transform-domain signals 1 and the group of transform-domain signals 2 will be used in spectral subtractor 16.

The group of transform-domain signals 1 can be considered to be the signals obtained by performing Fourier transformation on the output signal of subtractor 4 shown in FIG. 24, and the group of transform-domain signals 2 can be considered to be the signals obtained by performing Fourier transformation on the signal outputted from echo canceller 13 to subtractor 4 shown in FIG. 24.

The configuration and operation of spectral subtractor 16 shown in FIG. 24 will be described with reference to the corresponding FIGS.

Figure 26:
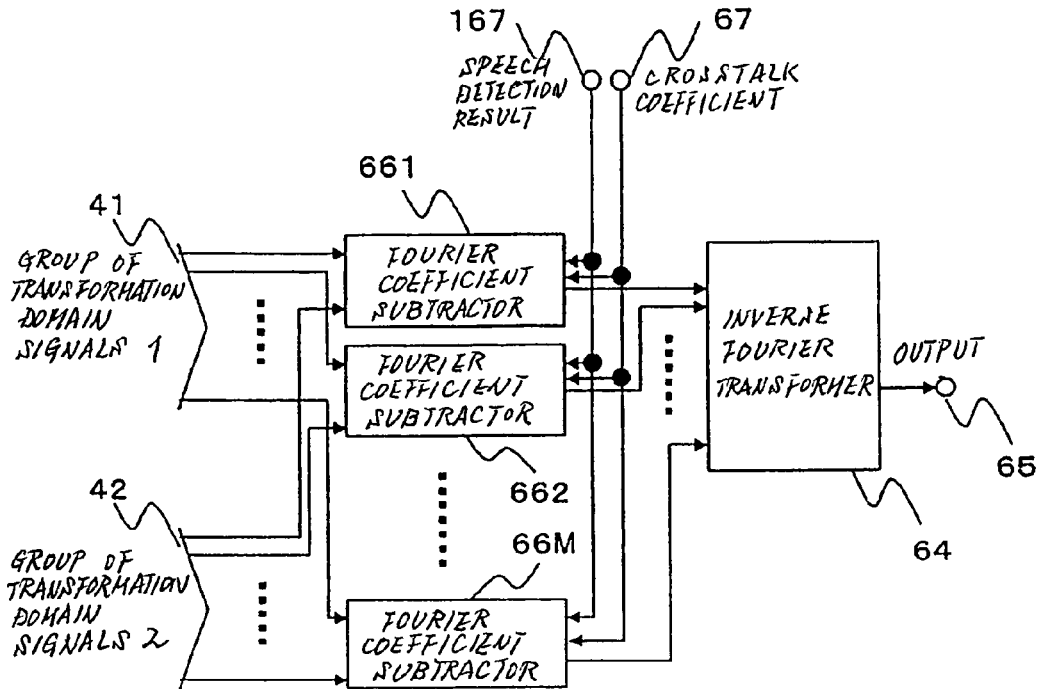
FIG. 26 is a block diagram showing an exemplary configuration of the spectral subtractor shown in FIG. 24.

FIG. 26 is a block diagram showing an exemplary configuration of the spectral subtractor shown in FIG. 24.

Spectral subtractor 16 shown in FIG. 26 differs from spectral subtractor 6 used in the echo suppressing apparatus of the first exemplary embodiment in that Fourier transformers 60 and 61 shown in FIG. 11 are removed and the group of transform-domain signals 1 and the group of transform-domain signals 2 are inputted.

As described above, the group of transform-domain signals 1 can be considered to be the signals obtained by performing Fourier transformation on the output signal of subtractor 4 shown in FIG. 24, and the group of transform-domain signals 2 can be considered to be the signals obtained by performing Fourier transformation on the signal outputted from echo canceller 13 to subtractor 4 shown in FIG. 24. These groups of signals are identical to the two signals inputted to Fourier coefficient subtractors 66*m* (m=1 to M) in spectral subtractor 6 shown in FIG. 11. Thus spectral subtractor 16 shown in FIG. 26 outputs signals identical to those outputted from spectral subtractor 6 shown in FIG. 11. Therefore, the echo suppressing apparatus of the fifth exemplary embodiment shown in FIG. 24 provides the same advantage as that provided in the echo suppressing apparatus of the first exemplary embodiment according to the present invention.

In the echo suppressing apparatus of the fifth exemplary embodiment, the amount of Fourier transformation performed by spectral subtractor 16 can be reduced by providing spectral subtractor 16 with the group of transform-domain signals 1 and the group of transform-domain signals 2 outputted from echo canceller 13.

Such a configuration is applicable to the echo suppressing apparatuses shown in the second to fourth exemplary embodiments. Further, the Fourier transform-domain can be replaced with, for example, a cosine transform-domain.

Sixth Exemplary Embodiment

While in the first to fourth exemplary embodiments, linear echo canceller 3 is used by way of example, a subband-domain echo canceller, for example, described in Non-Patent Document 4, can be used to suppress an echo. In this case, by carrying out the processes in spectral subtractor 6 or spectral suppresser 7 in a subband domain, a filter for subband domain transformation can be omitted.

Figure 27:
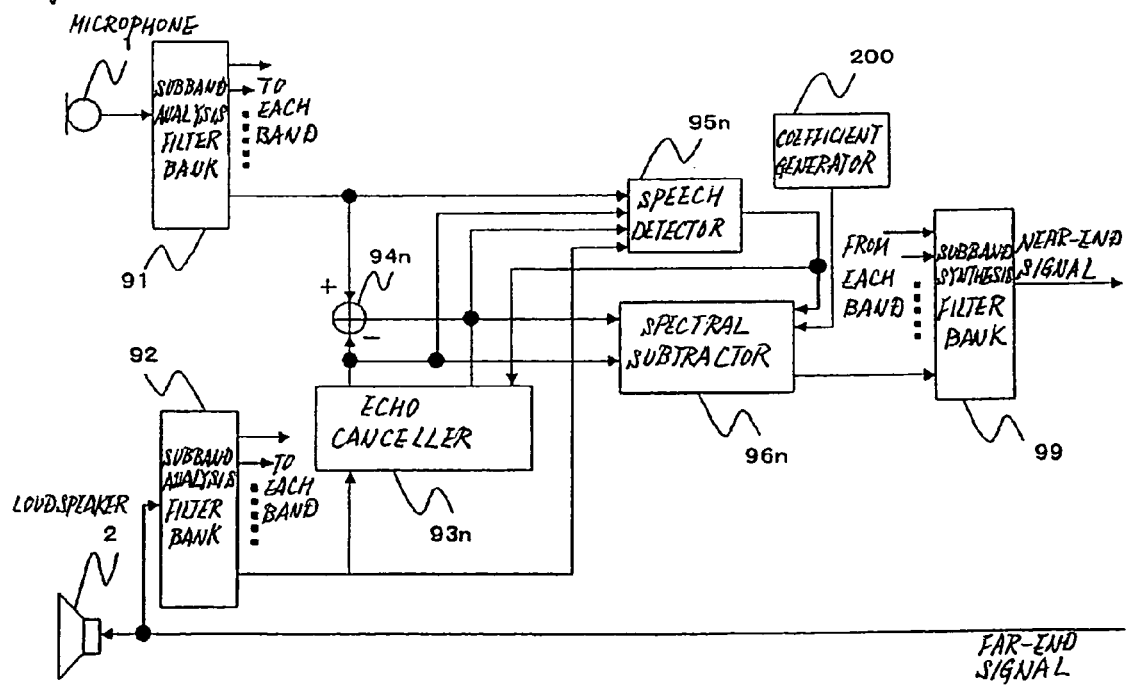
FIG. 27 is a block diagram showing the configuration of a sixth exemplary embodiment of the echo suppressing apparatus according to the present invention.

FIG. 27 is a block diagram showing the configuration of a sixth exemplary embodiment of the echo suppressing apparatus according to the present invention.

In the echo suppressing apparatus of the sixth exemplary embodiment, the echo canceller and the spectral subtractor carry out their processes in a subband domain.

As shown in FIG. 27, in the echo suppressing apparatus of the sixth exemplary embodiment, the output signal of microphone 1 is expanded by subband analysis filter bank 91 into N frequency bands, and the far-end signal is expanded by subband analysis filter bank 92 into N frequency bands.

Echo cancellers 93*n*, subtractors 94*n*, speech detectors 95*n*, and spectral subtractors 96*n* (n=1 to N) are provided to correspond to the frequency bands expanded by subband analysis filter banks 91 and 92.

The output signals of spectral subtractors 96*n* undergo inverse transformation in subband synthesis filter bank 99, and the transformed signal in the original signal domain is outputted as the near-end signal.

Subtractors 94*n*, speech detectors 95*n*, and spectral subtractors 96*n* (n=1 to N) operate in each of the frequency bands in a manner similar to those in the echo suppressing apparatus of the first exemplary embodiment shown in FIG. 8 except that the number of taps of the echo canceller is different and the scale of the Fourier transformer in the spectral subtractor is different. Therefore, a description of the configuration and operation of each of these devices will be omitted.

In the echo suppressing apparatus of the sixth exemplary embodiment, since all processes are carried out after subband domain expansion, the synthesis filter bank in linear echo canceller 3 and the subband analysis filter bank in the spectral subtractor can be omitted. Therefore, the amount of computation corresponding to the subband analysis filter bank and the subband synthesis filter bank can be reduced, and the delay time corresponding to such computation can be shortened.

The configuration of the sixth exemplary embodiment shown in FIG. 27 is applicable to the echo suppressing apparatuses shown in the second to fourth exemplary embodiments. Further, the Fourier transform-domain can be replaced with, for example, a cosine transform-domain.

Seventh Exemplary Embodiment

Figure 28:
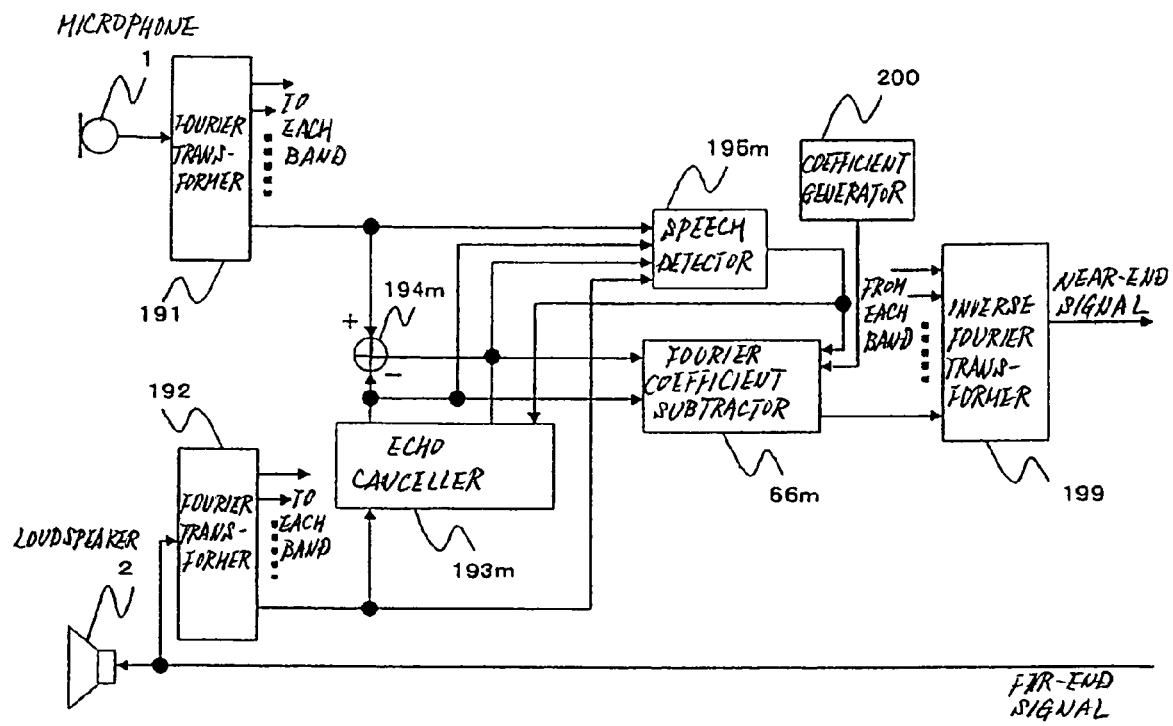
FIG. 28 is a block diagram showing the configuration of a seventh exemplary embodiment of the echo suppressing apparatus according to the present invention.

FIG. 28 is a block diagram showing the configuration of a seventh exemplary embodiment of the echo suppressing apparatus according to the present invention.

In the echo suppressing apparatus of the seventh exemplary embodiment, the echo canceller and the spectral subtractor carry out their processes in a Fourier transform-domain.

As shown in FIG. 28, in the echo suppressing apparatus of the seventh exemplary embodiment, the output signal of microphone 1 is expanded by Fourier transformer 191 into M frequency bands, and the far-end signal is expanded by Fourier transformer 192 into M frequency bands.

Echo cancellers 193*m*, subtractors 194*m*, speech detectors 195*m*, and Fourier coefficient subtractors 66*m* (m=1 to M) are provided to correspond to the frequency bands expanded by Fourier transformers 191 and 192.

The output signals of Fourier coefficient subtractors 66*m* for the respective frequency bands undergo inverse transformation in inverse Fourier transformer 199, and the transformed signal in the original signal domain is outputted as the near-end signal.

Subtractors 194*m* and speech detectors 195*m* operate in each of the frequency bands in a manner similar to those in the echo suppressing apparatus of the first exemplary embodiment shown in FIG. 8 except that the number of taps of the echo canceller is different. Therefore, a description of the configuration and operation of each of these devices will be omitted.

The echo suppressing apparatus of the seventh exemplary embodiment carries out the processes in the echo canceller and the spectral subtractor in a transform-domain as in the sixth exemplary embodiment, but differs from the echo suppressing apparatus of the sixth exemplary embodiment in that the number of frequency bands M is larger than that in the sixth exemplary embodiment because the processes are carried out in a Fourier transform-domain and the spectral subtractors are replaced with Fourier coefficient subtractors 66*m*.

In the echo suppressing apparatus of the seventh exemplary embodiment, since the processes are carried out after Fourier transform-domain expansion, Fourier transformation is not required for spectral subtraction. Therefore, no Fourier transformer or inverse Fourier transformer is required in the spectral subtractor in the seventh exemplary embodiment, and the operation necessary for spectral subtraction is carried out only by Fourier coefficient subtractors 66*m*.

In the echo suppressing apparatus of the seventh exemplary embodiment, the amount of computation that corresponds to the omitted Fourier transformer and inverse Fourier transformer can be reduced.

The configuration of the seventh exemplary embodiment shown in FIG. 28 is applicable to the echo suppressing apparatuses shown in the second to fourth exemplary embodiments. Further, the Fourier transform-domain can be replaced with, for example, a cosine transform-domain.

In the seventh exemplary embodiment, although a linear echo canceller is used by way of example, a nonlinear echo canceller can be used to suppress an echo. In this case as well, by carrying out the processes in the spectral subtractor or the spectral suppresser in a Fourier transform-domain, the same advantage described above is provided.

While the echo suppressing apparatuses of the present invention have been described with reference to a hands-free phone, the present invention is applicable to various apparatuses in which a loudspeaker produces audio and a microphone picks up sound at the same time, for example, an apparatus in which sound is picked up when a loudspeaker is producing music, or an apparatus in which an echo from a receiver provided in a handset causes a problem.

The invention claimed is:

1. An echo suppressing method comprising:
   using a signal that is transformed in a frequency domain from either an output signal of a sound pickup device or a signal obtained by subtracting the output signal of said sound pickup device after echo suppression from the output signal of said sound pickup device as a first signal;
   using a signal that is transformed in a frequency domain from the output signal after echo suppression as a second signal;
   multiplying said second signal by an estimated crosstalk value;
   estimating an amount of echo contained in said first signal based on the multiplication result; and
   suppressing the echo component in said first signal by using the estimated amount of echo,
   wherein the suppressed first signal is limited not to be smaller than an estimated value of near-end noise estimated for each frequency range in the frequency domain,
   wherein the estimated crosstalk value is a crosstalk coefficient that is a predetermined value and used to calculate the amount of crosstalk of said echo leaking into said first signal,
   wherein the crosstalk coefficient used to correct said first signal is selected from a plurality of preset crosstalk coefficients according to a predetermined use condition,
   wherein said use condition is one or more from among the power or amplitude of the output signal of said echo canceller, the power or amplitude of a far-end signal, and the power or amplitude of a specific frequency component of said far-end signal, and
   wherein the crosstalk coefficient is changed in two steps according to the amplitude of the output signal of said echo canceller.

2. The echo suppressing method according to claim 1, further comprising:
   using said estimated crosstalk value and multiplication result to estimate the amount or echo contained in said first signal;
   subtracting the estimated amount of echo from said first signal; and
   limiting the signal obtained by the subtraction not to be smaller than the estimated value of near-end noise.

3. The echo suppressing method according to claim 1, further comprising:
   using the estimated crosstalk value and said second signal to estimate the amount of echo contained in said first signal;
   subtracting the estimated amount of echo from said first signal; and
   using the signal obtained by limiting the signal obtained by the subtraction not to be smaller than the estimated value of near-end noise as a third signal;
   using the third signal and said first signal to estimate the proportion of the near-end signal contained in said first signal; and
   multiplying said first signal by the estimated proportion.

4. The echo suppressing method according to claim 1, further comprising:
   passing said first signal through a smoothing circuit to estimate the near-end noise,
   wherein said smoothing circuit is configured in such a way that the time constant of the smoothing process is large when the output signal is greater than the input signal and the time constant of the smoothing process is small when the input signal is smaller than the output signal.

5. The echo suppressing method according to claim 1, wherein said use condition is the relative positional relationship between said sound pickup device and said loudspeaker.

6. The echo suppressing method according to claim 1, wherein said use condition is the sound pickup device or loudspeaker being used when one or more from among said sound pickup device and said loudspeaker is/are provided in multiple numbers.

7. The echo suppressing method according to claim 1, wherein said first and second signals are used to calculate said estimated crosstalk value.

8. An echo suppressing method comprising:
   using a signal that is transformed in a frequency domain from either an output signal of a sound pickup device or a signal obtained by subtracting the output signal of said sound pickup device after echo suppression from the output signal of said sound pickup device as a first signal;
   using a signal that is transformed in a frequency domain from the output signal after echo suppression as a second signal;
   multiplying said second signal by an estimated crosstalk value;
   estimating an amount of echo contained in said first signal based on the multiplication result; and
   suppressing the echo component in said first signal by using the estimated amount of echo, wherein the suppressed first signal is limited not to be smaller than an estimated value of near-end noise estimated for each frequency range in the frequency domain, wherein the estimated crosstalk value is a crosstalk coefficient that is a predetermined value and used to calculate the amount of crosstalk of said echo leaking into said first signal, wherein the crosstalk coefficient used to correct said first signal is selected from a plurality of preset crosstalk coefficients according to a predetermined use condition, wherein said use condition is the sound level that said loudspeaker has been set to produce, and wherein the crosstalk coefficient is changed in two steps according to the power of the output signal of said echo canceller.

9. An echo suppressing apparatus for suppressing an echo generated by acoustic coupling between a sound pickup device and a loudspeaker, the apparatus comprising:

an echo canceller that uses an output signal of said sound pickup device to estimate said echo;

frequency dividers that use either the output signal of said sound pickup device or the signal obtained by subtracting the estimated echo from the output signal of said sound pickup device as a first signal, use the estimated echo as a second signal, and divide said first signal and said second signal into signals in predetermined frequency ranges;

a noise estimator that estimates the value of near-end noise for each of the frequency ranges of the divided first signals;

a corrector that multiplies said second signal by an estimated crosstalk value indicative of the degree of the echo left in said first signal and that estimates the amount of echo contained in said first signal based on the multiplication result and that suppresses the echo components in said first signals for the respective frequency ranges by using the estimated amount of echo;

a limiter that limits the corrected first signal not to be smaller than the estimated value of near-end noise estimated for each of the respective frequency ranges; and a frequency synthesizer that synthesizes the corrected first signals corrected for the respective frequency ranges and outputted from said limiter, wherein said estimated crosstalk value is a crosstalk coefficient that is a predetermined value and used to calculate the amount of crosstalk of said echo leaking into said first signal, wherein said corrector selects the crosstalk coefficient used to correct said first signal from a plurality of preset crosstalk coefficients according to a predetermined use condition, wherein said use condition is one or more from among the power or amplitude of the output signal of said echo canceller, the power or amplitude of a far-end signal, and the power or amplitude of a specific frequency component of said far-end signal, and wherein the crosstalk coefficient is changed in two steps according to the amplitude of the output signal of said echo canceller.

10. The echo suppressing apparatus according to claim 9, wherein said noise estimator is a smoothing circuit that smoothes and outputs said first signal, said smoothing circuit configured in such a way that the time constant of the smoothing process is large when the output signal is greater than the input signal and the time constant of the smoothing process is small when the input signal is smaller than the output signal.

11. The echo suppressing apparatus according to claim 9, wherein said use condition is the relative positional relationship between said sound pickup device and said loudspeaker.

12. The echo suppressing apparatus according to claim 9, wherein said use condition is the sound pickup device or loudspeaker being used when one or more from among said sound pickup device and said loudspeaker is/are provided in multiple numbers.

13. The echo suppressing apparatus according to claim 9, wherein said first and second signals are used to calculate said estimated crosstalk value.

14. An echo suppressing apparatus for suppressing an echo generated by acoustic coupling between a sound pickup device and a loudspeaker, the apparatus comprising:

an echo canceller that uses an output signal of said sound pickup device to estimate said echo;

frequency dividers that use either the output signal of said sound pickup device or the signal obtained by subtracting the estimated echo from the output signal of said sound pickup device as a first signal, use the estimated echo as a second signal, and divide said first signal and said second signal into signals in predetermined frequency ranges;

a noise estimator that estimates the value of near-end noise for each of the frequency ranges of the divided first signals;

a corrector that multiplies said second signal by an estimated crosstalk value indicative of the degree of the echo left in said first signal and that estimates the amount of echo contained in said first signal based on the multiplication result and that suppresses the echo components in said first signals for the respective frequency ranges by using the estimated amount of echo;

a limiter that limits the corrected first signal not to be smaller than the estimated value of near-end noise estimated for each of the respective frequency ranges; and a frequency synthesizer that synthesizes the corrected first signals corrected for the respective frequency ranges and outputted from said limiter, wherein said estimated crosstalk value is a crosstalk coefficient that is a predetermined value and used to calculate the amount of crosstalk of said echo leaking into said first signal, wherein said corrector selects the crosstalk coefficient used to correct said first signal from a plurality of preset crosstalk coefficients according to a predetermined use condition, wherein said use condition is the sound level that said loudspeaker has been set to produce, and wherein the crosstalk coefficient is changed in two steps according to the power of the output signal of said echo canceller.

15. An echo suppressing apparatus for suppressing an echo generated by acoustic coupling between a sound pickup device and a loudspeaker, the apparatus comprising:

a transform-domain echo canceller that uses an output signal of said sound pickup device to estimate said echo;

a noise estimator that uses the signals obtained by dividing the signal obtained by subtracting the estimated echo from the output signal of said sound pickup device as a group of first signals, the division being carried out in said transform-domain echo canceller for each predetermined frequency range, uses the signals in the respective predetermined frequency ranges of the output signal of said transform-domain echo canceller as a group of second signals, and estimates the value of near-end noise for each of said frequency ranges of the group of first signals;
a corrector for each of said frequency ranges that uses said second signal and an estimated crosstalk value indicative of the degree of the echo left in said first signal to suppress the echo component in said first signal;
a limiter that limits the corrected first signal not to be smaller than the estimated value of near-end noise estimated for each of the respective frequency ranges; and
a frequency synthesizer that synthesizes the corrected first signals corrected for the respective frequency ranges and outputted from said limiter,
wherein said estimated crosstalk value is a crosstalk coefficient that is a predetermined value and used to calculate the amount of crosstalk of said echo leaking into said first signal,
wherein said corrector selects the crosstalk coefficient used to correct said first signal from a plurality of preset crosstalk coefficients according to a predetermined use condition,
wherein said use condition is one or more from among the power or amplitude of the output signal of said echo canceller, the power or amplitude of a far-end signal, and the power or amplitude of a specific frequency component of said far-end signal, and
wherein the crosstalk coefficient is changed in two steps according to the amplitude of the output signal of said echo canceller.

16. An echo suppressing apparatus for suppressing an echo generated by acoustic coupling between a sound pickup device and a loudspeaker, the apparatus comprising:
an echo canceller that uses an output signal of said sound pickup device to estimate said echo;
subband analysis filters that expand the output signal of said sound pickup device and the output signal of said sound pickup device for each predetermined frequency range;
a noise estimator that uses either the signals obtained by expanding the output signal of said sound pickup device for the respective frequency ranges or the signals obtained by subtracting the estimated echo from the signals obtained by expanding the output signal of said sound pickup device for the respective frequency ranges as a group of first signals, uses the estimated echo as a second signal, and estimates the value of near-end noise for each of the frequency ranges of the group of first signals;
a corrector for each of said frequency ranges that uses said second signal and an estimated crosstalk value indicative of the degree of the echo left in said first signal to suppress the echo component in said first signal;
a limiter that limits the corrected first signal not to be smaller than the estimated value of near-end noise estimated for each of the respective frequency ranges; and
a frequency synthesizer that synthesizes the corrected first signals corrected for the respective frequency ranges and outputted from said limiter,
wherein said estimated crosstalk value is a crosstalk coefficient that is a predetermined value and used to calculate the amount of crosstalk of said echo leaking into said first signal,
wherein said corrector selects the crosstalk coefficient used to correct said first signal from a plurality of preset crosstalk coefficients according to a predetermined use condition,
wherein said use condition is one or more from among the power or amplitude of the output signal of said echo canceller, the power or amplitude of a far-end signal, and the power or amplitude of a specific frequency component of said far-end signal, and
wherein the crosstalk coefficient is changed in two steps according to the amplitude of the output signal of said echo canceller.

17. An echo suppressing apparatus for suppressing an echo generated by acoustic coupling between a sound pickup device and a loudspeaker, the apparatus comprising:
an echo canceller that uses an output signal of said sound pickup device to estimate said echo;
Fourier transformers that expand the output signal of said sound pickup device and the output signal of said sound pickup device for each predetermined frequency range;
a noise estimator that uses either the signals obtained by expanding the output signal of said sound pickup device for the respective frequency ranges or the signals obtained by subtracting the estimated echo from the signals obtained by expanding the output signal of said sound pickup device for the respective frequency ranges as a group of first signals, uses the estimated echo as a second signal, and estimates the value of near-end noise for each of the frequency ranges of the group of first signals;
a corrector for each of said frequency ranges that uses said second signal and an estimated crosstalk value indicative of the degree of the echo left in said first signal to suppress the echo component in said first signal;
a limiter that limits the corrected first signal not to be smaller than the estimated value of near-end noise estimated for each of the respective frequency ranges; and
a frequency synthesizer that synthesizes the corrected first signals corrected for the respective frequency ranges and outputted from said limiter,
wherein said estimated crosstalk value is a crosstalk coefficient that is a predetermined value and used to calculate the amount of crosstalk of said echo leaking into said first signal,
wherein said corrector selects the crosstalk coefficient used to correct said first signal from a plurality of preset crosstalk coefficients according to a predetermined use condition,
wherein said use condition is one or more from among the power or amplitude of the output signal of said echo canceller, the power or amplitude of a far-end signal, and the power or amplitude of a specific frequency component of said far-end signal, and
wherein the crosstalk coefficient is changed in two steps according to the amplitude of the output signal of said echo canceller.

18. An echo suppressing apparatus for suppressing an echo generated by acoustic coupling between a sound pickup device and a loudspeaker, the apparatus comprising:
a transform-domain echo canceller that uses an output signal of said sound pickup device to estimate said echo;
a noise estimator that uses the signals obtained by dividing the signal obtained by subtracting the estimated echo from the output signal of said sound pickup device as a group of first signals, the division being carried out in said transform-domain echo canceller for each predetermined frequency range, uses the signals in the respective predetermined frequency ranges of the output signal of said transform-domain echo canceller as a group of second signals, and estimates the value of near-end noise for each of said frequency ranges of the group of first signals;

a corrector for each of said frequency ranges that uses said second signal and an estimated crosstalk value indicative of the degree of the echo left in said first signal to suppress the echo component in said first signal;

a limiter that limits the corrected first signal not to be smaller than the estimated value of near-end noise estimated for each of the respective frequency ranges; and a frequency synthesizer that synthesizes the corrected first signals corrected for the respective frequency ranges and outputted from said limiter, wherein said estimated crosstalk value is a crosstalk coefficient that is a predetermined value and used to calculate the amount of crosstalk of said echo leaking into said first signal, wherein said corrector selects the crosstalk coefficient used to correct said first signal from a plurality of preset crosstalk coefficients according to a predetermined use condition, wherein said use condition is the sound level that said loudspeaker has been set to produce, and wherein the crosstalk coefficient is changed in two steps according to the power of the output signal of said echo canceller.

19. An echo suppressing apparatus for suppressing an echo generated by acoustic coupling between a sound pickup device and a loudspeaker, the apparatus comprising:

an echo canceller that uses an output signal of said sound pickup device to estimate said echo;

subband analysis filters that expand the output signal of said sound pickup device and the output signal of said sound pickup device for each predetermined frequency range;

a noise estimator that uses either the signals obtained by expanding the output signal of said sound pickup device for the respective frequency ranges or the signals obtained by subtracting the estimated echo from the signals obtained by expanding the output signal of said sound pickup device for the respective frequency ranges as a group of first signals, uses the estimated echo as a second signal, and estimates the value of near-end noise for each of the frequency ranges of the group of first signals;

a corrector for each of said frequency ranges that uses said second signal and an estimated crosstalk value indicative of the degree of the echo left in said first signal to suppress the echo component in said first signal;

a limiter that limits the corrected first signal not to be smaller than the estimated value of near-end noise estimated for each of the respective frequency ranges; and a frequency synthesizer that synthesizes the corrected first signals corrected for the respective frequency ranges and outputted from said limiter, wherein said estimated crosstalk value is a crosstalk coefficient that is a predetermined value and used to calculate the amount of crosstalk of said echo leaking into said first signal, wherein said corrector selects the crosstalk coefficient used to correct said first signal from a plurality of preset crosstalk coefficients according to a predetermined use condition, wherein said use condition is the sound level that said loudspeaker has been set to produce, and wherein the crosstalk coefficient is changed in two steps according to the power of the output signal of said echo canceller.

20. An echo suppressing apparatus for suppressing an echo generated by acoustic coupling between a sound pickup device and a loudspeaker, the apparatus comprising:

an echo canceller that uses an output signal of said sound pickup device to estimate said echo;

Fourier transformers that expand the output signal of said sound pickup device and the output signal of said sound pickup device for each predetermined frequency range;

a noise estimator that uses either the signals obtained by expanding the output signal of said sound pickup device for the respective frequency ranges or the signals obtained by subtracting the estimated echo from the signals obtained by expanding the output signal of said sound pickup device for the respective frequency ranges as a group of first signals, uses the estimated echo as a second signal, and estimates the value of near-end noise for each of the frequency ranges of the group of first signals;

a corrector for each of said frequency ranges that uses said second signal and an estimated crosstalk value indicative of the degree of the echo left in said first signal to suppress the echo component in said first signal;

a limiter that limits the corrected first signal not to be smaller than the estimated value of near-end noise estimated for each of the respective frequency ranges; and a frequency synthesizer that synthesizes the corrected first signals corrected for the respective frequency ranges and outputted from said limiter, wherein said estimated crosstalk value is a crosstalk coefficient that is a predetermined value and used to calculate the amount of crosstalk of said echo leaking into said first signal, wherein said corrector selects the crosstalk coefficient used to correct said first signal from a plurality of preset crosstalk coefficients according to a predetermined use condition, wherein said use condition is the sound level that said loudspeaker has been set to produce, and wherein the crosstalk coefficient is changed in two steps according to the power of the output signal of said echo canceller.

* * * * *

UNITED STATES PATENT AND TRADEMARK OFFICE
CERTIFICATE OF CORRECTION

PATENT NO.       : 8,433,074 B2
APPLICATION NO. : 12/084043
DATED            : April 30, 2013
INVENTOR(S)      : Osamu Hoshuyama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1186 days.

Signed and Sealed this
Eighth Day of September, 2015

Michelle K. Lee
*Director of the United States Patent and Trademark Office*